United States Patent
Merlin et al.

(10) Patent No.: US 8,942,123 B2
(45) Date of Patent: Jan. 27, 2015

(54) DEFERRAL MECHANISM FOR IMPROVED MEDIUM REUSE IN WIRELESS NETWORKS WITH TRANSMIT POWER IMBALANCES

(75) Inventors: Simone Merlin, San Diego, CA (US); Santosh Paul Abraham, San Diego, CA (US); Zhi Quan, San Diego, CA (US); Rahul Dangui, San Diego, CA (US); Alfred Asterjadhi, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 13/600,854

(22) Filed: Aug. 31, 2012

(65) Prior Publication Data

US 2013/0235737 A1    Sep. 12, 2013

Related U.S. Application Data

(60) Provisional application No. 61/530,762, filed on Sep. 2, 2011, provisional application No. 61/577,470, filed on Dec. 19, 2011.

(51) Int. Cl.
    *H04W 74/08*    (2009.01)
    *H04W 52/24*    (2009.01)

(52) U.S. Cl.
    CPC ........ *H04W 52/245* (2013.01); *H04W 74/0808* (2013.01)
    USPC .......................................................... 370/252

(58) Field of Classification Search
    CPC .............. H04W 74/08; H04W 52/245; H04W 74/0808
    USPC .................................. 370/252, 329
    See application file for complete search history.

(56) References Cited

U.S. PATENT DOCUMENTS

2006/0268924 A1    11/2006    Marinier et al.
2007/0280332 A1    12/2007    Srikanteswara et al.
(Continued)

FOREIGN PATENT DOCUMENTS

WO    2010001320 A1    1/2010

OTHER PUBLICATIONS

Botezatu, N., & Dhaou, R. (Jul. 2011). Proceedings of the World Congress on Engineering 2011 vol. II WCE 2011: Adaptive Power Control in 802.11 Wireless Mesh Networks. London, U.K.

(Continued)

*Primary Examiner* — Melvin Marcelo
(74) *Attorney, Agent, or Firm* — Kevin T. Cheatham

(57) ABSTRACT

The deferral mechanism described herein may improve medium reuse in a wireless network with transmit power imbalances. For example, in one embodiment, an apparatus employing the deferral mechanism described herein may comprise a receiver to sense a data unit transmitted on a medium associated with the wireless network, wherein the data unit may comprise information indicating a transmit power associated therewith. Furthermore, the apparatus may comprise one or more processors to initiate a transmission on the medium associated with the wireless network if the apparatus is not an intended receiver of the sensed data unit, the transmit power associated with the data unit exceeds a transmit power associated with the apparatus, and a received power associated with the data unit does not equal or exceed a clear channel assessment threshold plus a difference between the transmit power associated with the data unit and the transmit power associated with the apparatus.

56 Claims, 8 Drawing Sheets

(56) References Cited

U.S. PATENT DOCUMENTS

| | | |
|---|---|---|
| 2009/0047950 A1 | 2/2009 | Doppler et al. |
| 2009/0201885 A1 | 8/2009 | Kuroda et al. |
| 2010/0080173 A1* | 4/2010 | Takagi .......................... 370/328 |
| 2010/0157967 A1* | 6/2010 | Sakoda .......................... 370/338 |
| 2012/0008608 A1 | 1/2012 | Iacono et al. |
| 2012/0099450 A1 | 4/2012 | Madan et al. |

OTHER PUBLICATIONS

International Search Report and Written Opinion—PCT/US2012/053611—ISA/EPO—Nov. 12, 2012.

* cited by examiner

DEFERRAL MECHANISM FOR IMPROVED MEDIUM REUSE IN WIRELESS NETWORKS WITH TRANSMIT POWER IMBALANCES

PRIORITY CLAIM UNDER 35 U.S.C. §119

The present application claims priority to U.S. Provisional Patent Application Ser. No. 61/530,762, entitled "DEFERRAL MECHANISM FOR IMPROVED MEDIUM REUSE IN WIRELESS NETWORKS WITH TRANSMIT POWER IMABALANCES," filed Sep. 2, 2011, and to U.S. Provisional Patent Application Ser. No. 61/577,470, entitled "DEFERRAL MECHANISM FOR IMPROVED MEDIUM REUSE IN WIRELESS NETWORKS WITH TRANSMIT POWER IMABALANCES," filed Dec. 19, 2011, the contents of which are hereby incorporated by reference in their entirety.

FIELD OF DISCLOSURE

The present application relates generally to wireless communications, and more specifically to systems, methods, and devices that may employ a deferral mechanism to improve medium reuse in 802.11 wireless networks with transmit power imbalances.

BACKGROUND

In many telecommunication systems, communications networks are used to exchange messages among several inter-acting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks typically employ intangible physical media in an unguided propagation mode using electromagnetic waves in radio, microwave, infrared, optical, and/or other frequency bands. Wireless networks advantageously facilitate user mobility and rapid field deployment when compared to fixed wired networks.

The devices in a wireless network may transmit/receive information between each other. The information may comprise packets, which in various aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

Devices participating in a carrier sense multiple access (CSMA) wireless network must contend with each other for use of the medium (e.g., the radio frequency carrier) to transmit data, such as packets. While methods exist to allow multiple devices to access a shared medium without data loss, devices with relatively higher transmit power may dominate the medium based on current access algorithms. Accordingly, there is a need for devices and methods that increase a low power device's access to the shared medium.

SUMMARY

The following presents a simplified summary of one or more embodiments of the deferral mechanism for improved medium reuse in wireless networks with transmit power imbalances due to multiple devices or stations using different transmit power settings in order to provide a basic understanding of such embodiments. As such, this summary should not be considered an extensive overview of all contemplated embodiments, nor is this summary intended to identify key or critical elements of all embodiments described herein or delineate the scope of any particular embodiment. Accordingly, the sole purpose of this summary is to present certain concepts relating to one or more embodiments of the invention described herein in a simplified form as a prelude to the more detailed description that is presented below.

According to one aspect of the invention, an apparatus for wireless communication may comprise a receiver configured to sense a data unit transmitted on a medium associated with a carrier sense multiple access (CSMA) network, wherein the sensed data unit may comprise information that indicates a transmit power associated with the sensed data unit. Additionally, the apparatus may further comprise one or more processors configured to determine a received power associated with the sensed data unit and the transmit power associated with the sensed data unit from the information in the sensed data unit that indicates the transmit power. In one embodiment, the one or more processors may be further configured to initiate one or more transmissions on the medium associated with the CSMA network and drop the sensed data unit if the transmit power associated therewith exceeds a first threshold and the received power associated therewith does not equal or exceed a second threshold, or alternatively defer the one or more transmissions if either the transmit power associated with the sensed data unit does not exceed the first threshold or the received power associated with the sensed data unit equals or exceeds the second threshold. For example, in one embodiment, the first threshold may comprise a transmit power associated with the apparatus and the second threshold may comprise a clear channel assessment (CCA) threshold plus a difference between the transmit power associated with the sensed data unit and the transmit power associated with the apparatus.

According to one aspect of the invention, the apparatus may further comprise a transmitter configured to send the one or more transmissions on the medium associated with the CSMA network in a time period when the medium associated with the CSMA network is available. For example, in one embodiment, the sensed data unit may further comprise a signal field that indicates a duration associated with the sensed data unit and the time period when the medium is available may comprise at least the duration indicated in the signal field. In another embodiment, the sensed data unit may further comprise a media access control (MAC) header, wherein the MAC header and the signal field may have respective durations and the time period when the medium is available may comprise at least a portion of the duration associated with the sensed data unit after the duration associated with one or more of the signal field or the MAC header.

According to one aspect of the invention, the one or more processors associated with the apparatus may determine that one or more of the signal field, the MAC header, or the duration associated with the sensed data unit indicate that the sensed data unit comprises a request to send (RTS) packet (e.g., if the duration associated with the sensed data unit does not exceed a maximum duration associated with packets having the RTS type or if the signal field or MAC header include information to signal that the data unit has the RTS type). In response to determining that the sensed data unit comprises an RTS packet, the time period when the medium is available may begin after the duration associated with the sensed data unit, a Short Interframe Space (SIFS) duration, and at least a portion of a duration associated with a clear to send (CTS) message. Furthermore, in one embodiment, the receiver may be further configured to sense the CTS message on the medium associated with the CSMA network and the one or more processors may then store a network allocation vector (NAV) included in the sensed data unit, a received power associated with the sensed CTS message, and a NAV included in the sensed CTS message and initiate the one or more transmissions in the available time period, which may comprise at least a duration indicated in the NAV included in one or more of the sensed data unit or the sensed CTS message, if the received power associated with both the sensed data unit and the sensed CTS message are less than the second threshold. Alternatively, if the received power associated with either the sensed data unit or the sensed CTS message equals or exceeds the second threshold, the one or more processors may defer the transmissions for at least a duration indicated in the NAV included in one or more of the data unit or the CTS message for which the received power equaled or exceeded the second threshold.

According to one aspect of the invention, a method for wireless communication with a wireless apparatus may comprise sensing a data unit transmitted on a medium associated with the CSMA network, wherein the sensed data unit may comprise information that indicates a transmit power associated with the sensed data unit. Additionally, the method may further comprise determining a received power associated with the sensed data unit, determining the transmit power associated with the sensed data unit from the information in the sensed data unit that indicates the transmit power, and initiating one or more transmissions on the medium associated with the CSMA network and dropping the sensed data unit if the transmit power associated therewith exceeds a first threshold and the received power associated therewith does not equal or exceed a second threshold. Furthermore, in one embodiment, the method may comprise deferring the one or more transmissions if either the transmit power associated with the sensed data unit does not exceed the first threshold or the received power associated with the sensed data unit equals or exceeds the second threshold. For example, in one embodiment, the first threshold may comprise a transmit power associated with the wireless apparatus and the second threshold may comprise a CCA threshold plus a difference between the transmit power associated with the sensed data unit and the transmit power associated with the wireless apparatus.

According to one aspect of the invention, the method may further comprise sending the one or more transmissions on the medium associated with the CSMA network in a time period when the medium associated with the CSMA network is available. For example, in one embodiment, the sensed data unit may further comprise a signal field that indicates a duration associated with the sensed data unit and the time period when the medium is available may comprise at least the duration indicated in the signal field. In another embodiment, the sensed data unit may further comprise a MAC header, wherein the MAC header and the signal field may have respective durations and the time period when the medium is available may comprise at least a portion of the duration associated with the sensed data unit after the duration associated with one or more of the signal field or the MAC header.

According to one aspect of the invention, the method may further comprise determining that one or more of the signal field, the MAC header, or the duration associated with the sensed data unit indicate that the sensed data unit comprises an RTS packet. In response to determining that the sensed data unit comprises an RTS packet, the time period when the medium is available may begin after the duration associated with the sensed data unit, a SIFS duration, and at least a portion of a duration associated with a CTS message. Furthermore, in one embodiment, the method may comprise sensing the CTS message on the medium associated with the CSMA network, storing a NAV included in the sensed data unit, a received power associated with the sensed CTS message, and a NAV included in the sensed CTS message, and initiating the one or more transmissions in the available time period, which may comprise at least a duration indicated in the NAV included in one or more of the sensed data unit or the sensed CTS message, if the received power associated with both the sensed data unit and the sensed CTS message are less than the second threshold. Alternatively, if the received power associated with either the sensed data unit or the sensed CTS message equals or exceeds the second threshold, the method may comprise deferring the transmissions for at least a duration indicated in the NAV included in one or more of the data unit or the CTS message for which the received power equaled or exceeded the second threshold.

According to one aspect of the invention, a tangible computer-readable medium may store instructions that, when executed on an apparatus, cause the apparatus to sense a data unit transmitted on a medium associated with the CSMA network, wherein the sensed data unit may comprise information that indicates a transmit power associated with the sensed data unit. Additionally, the instructions may cause the apparatus to determine a received power associated with the sensed data unit, determine the transmit power associated with the sensed data unit from the information in the sensed data unit that indicates the transmit power, and initiate one or more transmissions on the medium associated with the CSMA network and drop the sensed data unit if the transmit power associated therewith exceeds a first threshold and the received power associated therewith does not equal or exceed a second threshold. Furthermore, in one embodiment, the instructions may cause the apparatus to defer the transmissions if either the transmit power associated with the sensed data unit does not exceed the first threshold or the received power associated with the sensed data unit equals or exceeds the second threshold. For example, in one embodiment, the first threshold may comprise a transmit power associated with the apparatus and the second threshold may comprise a CCA threshold plus a difference between the transmit power associated with the sensed data unit and the transmit power associated with the apparatus.

According to one aspect of the invention, the instructions may further cause the apparatus to send the one or more transmissions on the medium associated with the CSMA network in a time period when the medium associated with the CSMA network is available. For example, in one embodiment, the sensed data unit may further comprise a signal field that indicates a duration associated with the sensed data unit and the time period when the medium is available may comprise at least the duration indicated in the signal field. In another embodiment, the sensed data unit may further comprise a MAC header, wherein the MAC header and the signal field may have respective durations and the time period when the medium is available may comprise at least a portion of the duration associated with the sensed data unit after the duration associated with one or more of the signal field or the MAC header.

According to one aspect of the invention, the instructions may further cause the apparatus to determine that one or more of the signal field, the MAC header, or the duration associated with the sensed data unit indicate that the sensed data unit comprises an RTS packet. In response to determining that the sensed data unit comprises an RTS packet, the time period when the medium is available may begin after the duration associated with the sensed data unit, a SIFS duration, and at least a portion of a duration associated with a CTS message. Furthermore, in one embodiment, the instructions may further cause the apparatus to sense the CTS message on the medium associated with the CSMA network, store a NAV included in the sensed data unit, a received power associated with the sensed CTS message, and a NAV included in the sensed CTS message, and initiate the one or more transmissions in the available time period, which may comprise at least a duration indicated in the NAV included in one or more of the sensed data unit or the sensed CTS message, if the received power associated with both the sensed data unit and the sensed CTS message are less than the second threshold. Alternatively, if the received power associated with either the sensed data unit or the sensed CTS message equals or exceeds the second threshold, the instructions may further cause the apparatus defer the transmissions for at least a duration indicated in the NAV included in one or more of the data unit or the CTS message for which the received power equaled or exceeded the second threshold.

According to one aspect of the invention, an apparatus for wireless communication may comprise means for sensing a data unit transmitted on a medium associated with the CSMA network, wherein the sensed data unit may comprise information that indicates a transmit power associated with the sensed data unit. Additionally, the apparatus may comprise means for determining a received power associated with the sensed data unit, means for determining the transmit power associated with the sensed data unit from the information in the sensed data unit that indicates the transmit power, and means for initiating one or more transmissions on the medium associated with the CSMA network and means for dropping the sensed data unit if the transmit power associated therewith exceeds a first threshold and the received power associated therewith does not equal or exceed a second threshold. Furthermore, in one embodiment, the apparatus may include means for deferring the transmissions if either the transmit power associated with the sensed data unit does not exceed the first threshold or the received power associated with the sensed data unit equals or exceeds the second threshold. For example, in one embodiment, the first threshold may comprise a transmit power associated with the apparatus and the second threshold may comprise a CCA threshold plus a difference between the transmit power associated with the sensed data unit and the transmit power associated with the apparatus.

According to one aspect of the invention, the apparatus may further comprise means for sending the one or more transmissions on the medium associated with the CSMA network in a time period when the medium associated with the CSMA network is available. For example, in one embodiment, the sensed data unit may further comprise a signal field that indicates a duration associated with the sensed data unit and the time period when the medium is available may comprise at least the duration indicated in the signal field. In another embodiment, the sensed data unit may further comprise a MAC header, wherein the MAC header and the signal field may have respective durations and the time period when the medium is available may comprise at least a portion of the duration associated with the sensed data unit after the duration associated with one or more of the signal field or the MAC header.

According to one aspect of the invention, the apparatus may further comprise means for determining that one or more of the signal field, the MAC header, or the duration associated with the sensed data unit indicate that the sensed data unit comprises an RTS packet. In response to determining that the sensed data unit comprises an RTS packet, the time period when the medium is available may begin after the duration associated with the sensed data unit, a SIFS duration, and at least a portion of a duration associated with a CTS message. Furthermore, in one embodiment, the apparatus may comprise means for sensing the CTS message on the medium associated with the CSMA network, means for storing a NAV included in the sensed data unit, a received power associated with the sensed CTS message, and a NAV included in the sensed CTS message, and means for initiating the one or more transmissions in the available time period, which may comprise at least a duration indicated in the NAV included in one or more of the sensed data unit or the sensed CTS message, if the received power associated with both the sensed data unit and the sensed CTS message are less than the second threshold. Alternatively, if the received power associated with either the sensed data unit or the sensed CTS message equals or exceeds the second threshold, the apparatus may comprise means for deferring the transmissions for at least a duration indicated in the NAV included in one or more of the data unit or the CTS message for which the received power equaled or exceeded the second threshold.

According to one aspect of the invention, a tangible computer-readable medium may store a data unit that comprises information to indicate a transmit power associated with the data unit. For example, in one embodiment, the information that indicates the transmit power may comprise one or more bits that indicate the transmit power according to a non-numeric power level (e.g., a single bit set to a logical zero or a logical one to indicate whether a high power level or a low power level was used to transmit the data unit, or multiple bits set to logical zeroes or ones to indicate the power level according to more granularity). In another example, the information that indicates the transmit power may comprise one or more bits that indicate the transmit power according to a numeric power level (e.g., in decibels relative to one milliwatt). In one embodiment, the data unit stored on the tangible computer-readable medium may include a preamble having the information that indicates the transmit power associated with the data unit in one or more signal fields. In another embodiment, the data unit may include a MAC header having the information that indicates the transmit power and a cyclic redundancy check corresponding to the MAC header to ensure that the information indicating the transmit power can be considered reliable.

Other objects and advantages associated with the embodiments relating to the deferral mechanism for improved medium reuse in wireless network with transmit power imbalances described herein will be apparent to those skilled in the art based on the accompanying drawings and detailed description.

DETAILED DESCRIPTION

Figure 1:
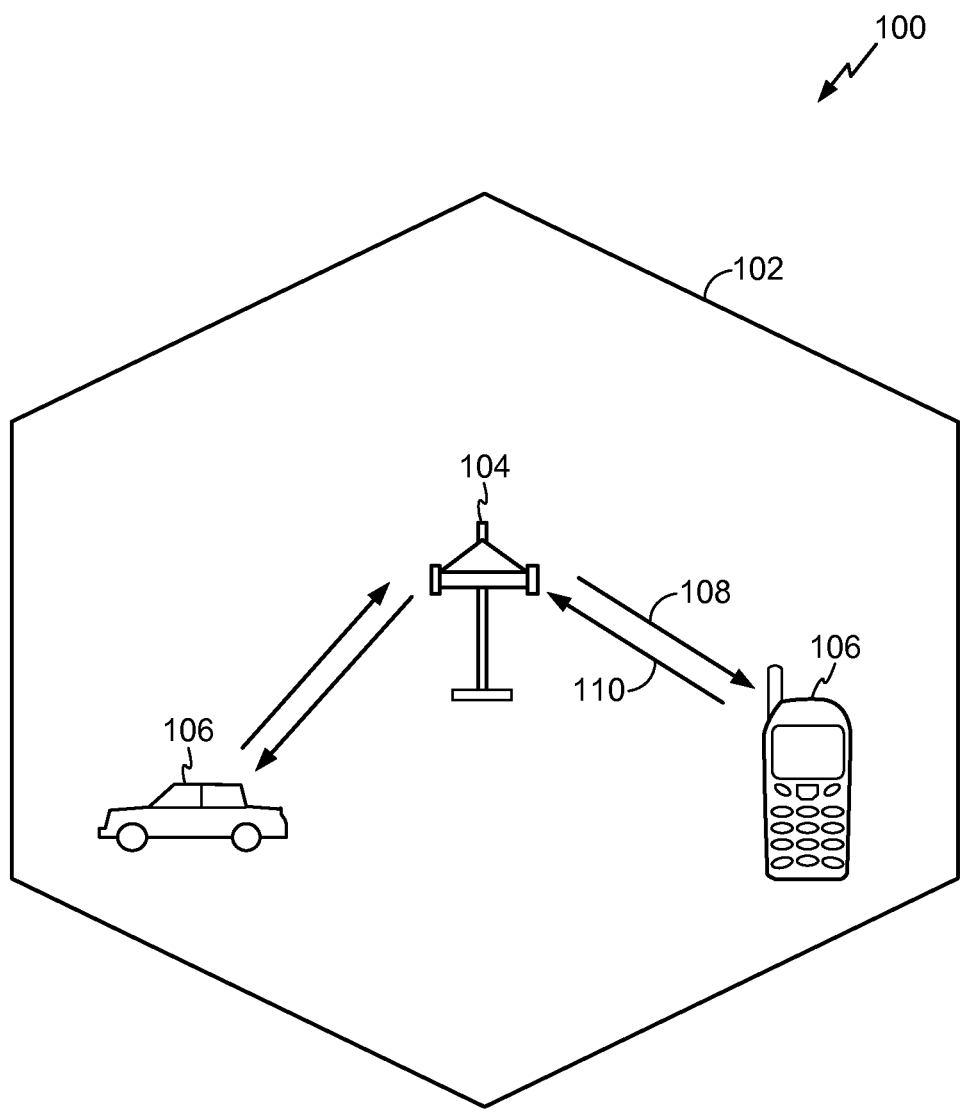
FIG. 1 illustrates an exemplary wireless communication system that may employ the deferral mechanism for improved medium reuse described herein.

Various aspects of the novel systems, apparatuses, and methods are described more fully hereinafter with reference to the accompanying drawings. The teachings in this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, those skilled in the art will appreciate that the scope of the disclosure covers any aspect of the novel systems, apparatuses, and methods disclosed herein, whether implemented independently from or in combination with any other aspects of the invention. For example, an apparatus may be implemented or a method may be practiced using any number of the aspects set forth herein. In addition, the scope of the invention is intended to cover an apparatus or method practiced using other structures, functionality, or structure and functionality in addition to or other than the various aspects of the invention set forth herein. It should be understood that any aspect disclosed herein may be embodied by one or more elements recited in a claim.

Although particular aspects are described herein, many variations and permutations of these aspects fall within the scope of the disclosure. Although various benefits and advantages of the preferred aspects are mentioned, the scope of the disclosure is not intended to be limited to particular benefits, uses, or objectives. Rather, aspects of the disclosure are intended to be broadly applicable to various different wireless technologies, system configurations, networks, and transmission protocols, examples of which are illustrated in the drawings and described in the following description. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various embodiments of the deferral mechanism for improved medium reuse described herein may be used in wireless networks that implement any suitable communication standard, including WiFi or, more generally, any member of the IEEE 802.11 family of wireless protocols. For example, the various embodiments of the deferral mechanism for improved medium reuse described herein may be used as part of the IEEE 802.11ah protocol or in any suitable wireless network that implements or otherwise employs the IEEE 802.11ah protocol, which generally uses sub-gigahertz (Sub-GHz) bands.

In various embodiments, wireless signals in a Sub-GHz band may be transmitted according to the 802.11ah protocol using orthogonal frequency-division multiplexing (OFDM), direct-sequence spread spectrum (DSSS) communications, a combination of OFDM and DSSS communications, or other suitable schemes Implementations of the 802.11ah protocol may be used for sensors, metering, and smart grid networks. Advantageously, devices implementing the 802.11ah protocol may consume less power and transmit and receive wireless signals communicated over relatively long distances (e.g., about one kilometer or longer) relative to devices that implement other wireless protocols.

In various embodiments, a WLAN includes various devices that access the wireless network. For example, the wireless network may generally include two types of devices: access points ("APs") and clients (also referred to as stations or "STAs"). In general, an AP serves as a hub or base station for the WLAN and an STA serves as a user of the WLAN. For example, an STA may be a laptop computer, a personal digital assistant (PDA), a mobile phone, or any other suitable device that supports wireless communication. In one example, an STA connects to an AP via a WiFi compliant wireless link (e.g., an IEEE 802.11 protocol, such as the under-development 802.11ah standard) to obtain general connectivity to the Internet or other wide area networks. In various embodiments, an STA may also be used as an AP (e.g., pursuant to the WiFi Direct standard). APs and STAs may be referred to generally as transmitting or receiving nodes in a wireless communication network.

An access point ("AP") may also comprise, be implemented as, or known as a NodeB, a Radio Network Controller ("RNC"), an eNodeB, a Base Station Controller ("BSC"), a Base Transceiver Station ("BTS"), a Base Station ("BS"), a Transceiver Function ("TF"), a Radio Router, a Radio Transceiver, or other suitable terminology.

A station ("STA") may also comprise, be implemented as, or known as an access terminal ("AT"), a subscriber station, a subscriber unit, a mobile station, a remote station, a remote terminal, a user terminal, a user agent, a user device, user equipment, or other suitable terminology. In various embodiments, an access terminal may comprise a cellular telephone, a cordless telephone, a Session Initiation Protocol ("SIP") phone, a wireless local loop ("WLL") station, a PDA, a handheld device having wireless connection capability, or other suitable processing device connected to a wireless modem. Accordingly, one or more embodiments described herein may be incorporated into a phone (e.g., a cellular phone or smartphone), a computer (e.g., a laptop), a portable communication device, a headset, a portable computing device (e.g., a personal data assistant), an entertainment device (e.g., a music device, a video device, a satellite radio, etc.), a gaming device or system, a global positioning system device, or any other suitable device that is configured to communicate via a wireless medium.

As discussed above, certain devices described herein may implement the 802.11ah standard, for example. Such devices, whether used as an STA or AP or other device, may be used for smart metering or in a smart grid network. Such devices may further provide sensor applications or be used in home automation. Alternatively (or additionally), the devices may be used in a healthcare context, for surveillance, to enable extended-range Internet connectivity (e.g., for use with hotspots), and/or to implement machine-to-machine communications, among other uses.

Wireless nodes, such as STAs and APs, may interact in a carrier sense multiple access (CSMA) type network that conforms to the 802.11ah standard. CSMA is a probabilistic Media Access Control (MAC) protocol. The terminology "carrier sense" relates to functionality whereby a node attempting to transmit on a shared medium may use feedback from a receiver associated with the node to detect a carrier wave before trying to send a transmission, while "multiple access" relates to an arrangement whereby multiple nodes may send and receive transmissions on the shared medium. Accordingly, in a CSMA type network, a transmitting node that senses the shared medium using the receiver associated therewith will defer sending a transmission over the shared time to a later time if the transmitting node senses that the shared medium is busy or otherwise unavailable (e.g., in response to sensing that another node is transmitting on the shared medium). However, if the transmitting node senses that the shared medium is free or otherwise available (e.g., when no other transmissions are detected), then the transmitting node may initiate the transmission to send data over the shared medium.

According to various embodiments, a Clear Channel Assessment (CCA) procedure is used to determine the state of the shared medium before a node attempts to transmit thereon. The CCA procedure is executed while the receiver associated with the node is turned on and the node is not currently transmitting a data unit (e.g., a data frame or packet). The node may sense whether the shared medium is clear or otherwise available, for example, via detecting a PHY preamble that indicates the start of a packet. This technique may generally detect relatively weak signals and therefore employ a low detection threshold. An alternative technique, referred to as energy detection (ED), may detect energy on the air. However, this technique may be more difficult than detecting the start of a packet and may be better suited to detecting relatively strong signals. As such, the ED technique to detect energy on the air may have a higher detection threshold. In general, detection of another transmission on the shared medium may be considered a function of the received power of the transmission, wherein the received power is the transmitted power minus the path loss.

While CSMA is particularly effective for mediums that are not heavily used, performance degradation may occur where the medium becomes crowded with many devices attempting simultaneous access. For example, when multiple transmitting nodes attempt to use the medium at once, collisions between the simultaneous transmissions may occur and transmitted data may be lost or otherwise corrupted. Because wireless data communications typically cannot listen to the medium while transmitting thereon, collision detection may not possible. Further, transmissions by one node are generally only received by other nodes using the medium that are within range of the transmitting node. This is known as the hidden node problem, whereby a first node wishing to transmit to a receiving node within range of the first node is not in range of a second node that may be currently transmitting to the receiving node. Therefore, the first node cannot know that the second node is transmitting to the receiving node and thus occupying the medium. In such a situation, the first node may sense that the medium is free and begin to transmit, which may then cause a collision resulting in lost data at the receiving node. Accordingly, collision avoidance schemes to improve the performance of CSMA attempt to divide access to the medium in an equal or otherwise fairly allocated manner among all transmitting nodes within a collision domain. Notably, collision avoidance differs from collision detection due to the nature of the medium, in this case the radio frequency spectrum.

In a CSMA network utilizing collision avoidance (CA), a node wishing to transmit initially senses the medium and defers transmission if the medium is busy (i.e., the node does not transmit for a period of time). The deferral period is followed by a randomized backoff period (i.e., an additional period of time in which the node wishing to transmit will not attempt to access the medium). The backoff period, which may also be referred to as a contention window, is used to resolve contention between different nodes trying to access the medium at the same time. Backoff requires each node trying to access the medium to choose a random number in a range, wait the chosen number of time slots before trying to access the medium, and check whether a different node has previously accessed the medium. The time slots are defined in such a way that a node will always be capable of determining if another node has accessed the medium at the beginning of the previous slot. In particular, the 802.11 standard uses an exponential backoff algorithm in which a node will increase the maximum number of the range exponentially each time that the node chooses a slot and collides with another node. On the other hand, if a node wishing to transmit senses that the medium is free for a specified time, called the Distributed Inter Frame Space (DIFS) in the 802.11 standard, then the node is allowed to transmit on the medium. After transmitting, the receiving node will perform a cyclic redundancy check (CRC) of the received data and send an acknowledgement back to the transmitting node, wherein receipt of the acknowledgment at the transmitting node will indicate to the transmitting node that no collision has occurred. In a similar respect, the transmitting node not receiving an acknowledgement will indicate that a collision has occurred and that the transmitting node should therefore resend the data.

Additionally, in one embodiment, the wireless network may implement virtual carrier sensing whereby a node wishing to transmit may initially transmit a short control packet called a Request to Send (RTS) message to a receiving node. The RTS may include a source address, a destination address, and duration of the transmission, including the responsive acknowledgment. If the medium is free, the receiving node may then respond with a Clear to Send (CTS) message, which may generally include the same or substantially similar information as the RTS. Any node within range of either the RTS or CTS may set a virtual carrier sense indicator, which may be called a Network Allocation Vector (NAV), for a period corresponding to the given duration indicated in the RTS message and/or the CTS message and defer from attempting to transmit on the medium during that period. Thus, implementing virtual carrier sensing may reduce the probability that a hidden transmitting node will cause a collision at the receiving node. Use of RTS and CTS may also reduce overhead because the RTS and CTS message frames are relatively shorter than the full message frame that the transmitting node intends to transmit. In particular, because the transmitting node may determine that the receiver is busy based on sending the RTS message and not receiving a CTS message in response thereto, the transmitting node may use less medium time to determine whether the medium is available or busy relative to mechanisms in which the transmitting node sends a full data frame and does not receive an acknowledgement in response thereto.

If all transmitting nodes on a wireless network such as a CSMA network with collision avoidance transmit at approximately the same power level, then the medium tends to be shared equally or in an otherwise fair manner between the nodes accessing the wireless network. In particular, no one node would dominate the medium under normal circumstances where all transmitting nodes use the same or substantially similar power levels. However, if different nodes transmit at different power levels, then the medium may not be shared in an equal or otherwise fair manner, for example, because an STA transmitting to an AP at a relatively high power level may block a far away STA trying to transmit to the AP at a relatively low power level. However, the same is not true in reverse (i.e., a remote low power STA attempting to access a particular AP will rarely or never block the transmissions of closer high power STAs accessing the same AP). As such, access to the medium can become unbalanced where participating nodes use disparate transmission power levels to communicate with the same AP.

Transmit power imbalance may be a particularly important issue for low power nodes. For example, an AP may transmit at 20 dBm whereas a low power STA may transmit near 0 dBm, wherein the dBm values may represent the transmit power in decibels relative to one milliwatt. In such cases, the low power STA will defer to the AP, but not vice versa, whereby the lower power STA may have relatively less access to the medium. Accordingly, there is a need for a mechanism to maintain equal or otherwise fair access to a medium for low power nodes in wireless networks with transmit power imbalances.

According to one aspect of the invention, FIG. 1 illustrates an exemplary wireless communication system 100 that may employ a deferral mechanism for improved medium reuse in wireless networks with transmit power imbalances. In one embodiment, the wireless communication system 100 may operate pursuant to a wireless standard (e.g., 802.11ah) and include an AP 104 that communicates with one or more STAs 106. In one embodiment, various processes and mechanisms may be used to support transmissions in the wireless communication system 100 between the AP 104 and the STAs 106. For example, in one embodiment, the transmissions in the wireless communication system 100 may generally include signals sent from the AP 104 and received at the STAs 106 and signals sent from the STAs 106 and received at the AP 104 in accordance with OFDM/OFDMA techniques, in which case the wireless communication system 100 may be referred to as an OFDM/OFDMA system. Alternatively (or additionally), the signals may be sent from and received at the AP 104 and the STAs 106 in accordance with CDMA techniques, in which case the wireless communication system 100 may be referred to as a CDMA system.

In one embodiment, a communication link that carries transmissions from the AP 104 to one or more of the STAs 106 may be referred to as a downlink (DL) 108, wherein the downlink 108 may also be referred to as a forward link or forward channel, and a communication link that carries transmissions from one or more of the STAs 106 to the AP 104 may be referred to as an uplink (UL) 110, wherein the uplink 110 may also be referred to as a reverse link or a reverse channel. In one embodiment, the AP 104 may generally act as a base station and provide wireless communication coverage in a basic service area (BSA) 102. The AP 104 in addition to the STAs 106 that are associated therewith and use the AP 104 for wireless communication may be referred to as a basic service set (BSS). However, in one embodiment, those skilled in the art will appreciate that the wireless communication system 100 may not necessarily have a central AP 104, but rather may function as a peer-to-peer or ad-hoc network between the STAs 106. Accordingly, the functions of the AP 104 described herein may alternatively be implemented or otherwise performed by one or more of the STAs 106 (e.g., in accordance with the WiFi direct standard).

Figure 2:
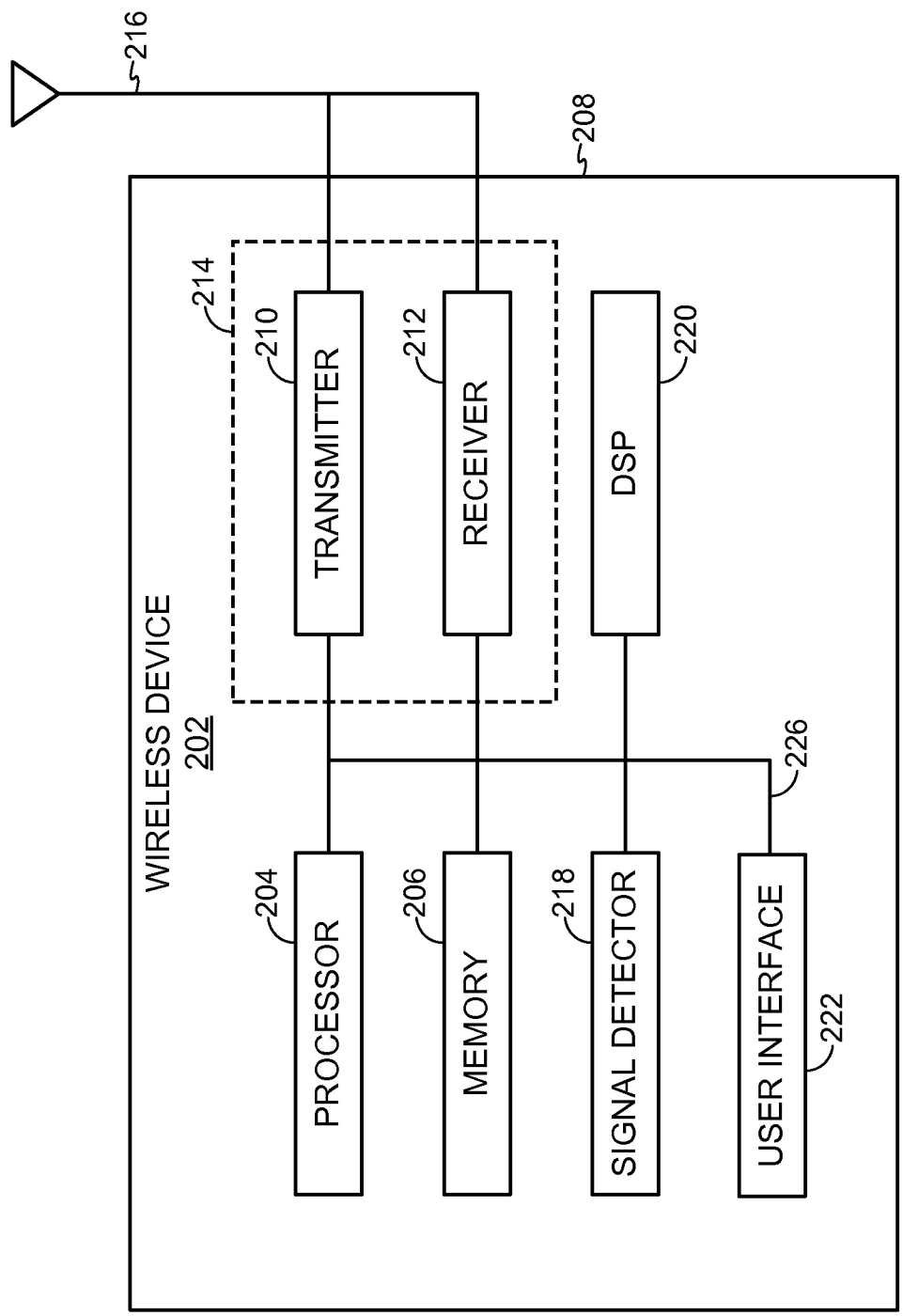
FIG. 2 illustrates an exemplary wireless device that may employ the deferral mechanism for improved medium reuse described herein within the wireless communication system of FIG. 1.

According to one aspect of the invention, FIG. 2 illustrates an exemplary wireless device 202 that may employ the deferral mechanism for improved medium reuse described herein within the wireless communication system 100 shown in FIG. 1. In one embodiment, the wireless device 202 may represent any suitable device that can be configured to implement the various features associated with the deferral mechanism for improved medium reuse described herein. For example, in certain embodiments, the wireless device 202 shown in FIG. 2 may comprise the AP 104, one of the STAs 106, or one of the STAs 106 implementing or otherwise performing the functions of the AP 104.

In one embodiment, the wireless device 202 may include a processor 204 that controls operation of the wireless device 202. The processor 204 may also be referred to as a central processing unit (CPU). In addition, the wireless device 202 may include a memory 206, which may include read-only memory (ROM) and/or random access memory (RAM), and which may store instructions and data that the processor 204 may execute and/or utilize to control the operation of the wireless device 202. In one embodiment, the memory 206 may further include non-volatile random access memory (NVRAM). The processor 204 may generally perform logical and arithmetic operations based on the instructions stored in the memory 206 and/or execute the instructions stored in the memory 206 to implement the deferral mechanism for improved medium reuse described herein described herein.

In one embodiment, the processor 204 may comprise or be a component of a processing system implemented with one or more processors, wherein the one or more processors may be implemented with any combination of general-purpose microprocessors, microcontrollers, digital signal processors, field programmable gate array, programmable logic devices, controllers, state machines, gated logic, discrete hardware components, dedicated hardware finite state machines, or any other suitable components that can perform calculations or otherwise manipulate information. The processing system may also include machine-readable media for storing software, wherein software may be broadly construed to mean any type of instructions, whether referred to as software, firmware, middleware, microcode, hardware description language, or otherwise. In one embodiment, the instructions may include code (e.g., in source code format, binary code format, executable code format, or other suitable formats), wherein executing the instructions on the one or more processors may cause the processing system to perform the various functions described herein.

In one embodiment, the wireless device 202 may further include a housing 208 and a transceiver 214 having a transmitter 210 and a receiver 212 to allow transmission and reception of data between the wireless device 202 and a remote entity. In one embodiment, the data may be transmitted to and received from the remote entity via an antenna 216 attached to the housing 208 and electrically coupled to the transceiver 214. Furthermore, those skilled in the art will appreciate that the wireless device 202 may suitably include multiple transmitters, multiple receivers, multiple transceivers, and/or multiple antennas.

In one embodiment, the wireless device 202 may further include a signal detector 218 that may be used to detect and quantify the levels of signals transmitted and received via the transceiver 214. The signal detector 218 may detect such signals as total energy, energy per subcarrier per symbol, power spectral density, and other suitable signals. The wireless device 202 may also include a digital signal processor (DSP) 220 for use in processing the signals transmitted and received via the transceiver 214. For example, in one embodiment, the DSP 220 may be configured to generate data units for transmission via the transmitter 210. In various embodiments, the data unit may comprise a physical layer protocol data unit (PPDU), which may also be referred to as a packet.

In one embodiment, the wireless device 202 may further include a user interface 222, wherein the user interface 222 may include a keypad, a microphone, a speaker, a display, and/or other suitable elements or components that can convey information to a user of the wireless device 202 and/or receive input from the user. Furthermore, in one embodiment, the various components of the wireless device 202 may be coupled together via a bus system 226. For example, the bus system 226 may include a data bus in addition to a power bus, a control signal bus, and a status signal bus. However, those skilled in the art will appreciate that the components of the wireless device 202 may be coupled or accept or provide inputs to each other using other suitable mechanisms.

Although FIG. 2 illustrates the wireless device 202 as having various separate components, those skilled in the art will recognize that one or more of the components may be suitably combined or commonly implemented. For example, the processor 204 may implement the functionality described above with respect thereto in addition to the functionality described above with respect to the signal detector 218 and/or the DSP 220. Further, those skilled in the art will recognize that any particular component illustrated in FIG. 2 may be implemented using multiple separate elements (e.g., the transmitter 210 may include multiple transmitters 210, the receiver 212 may include multiple receivers 212, etc.).

Figure 3:
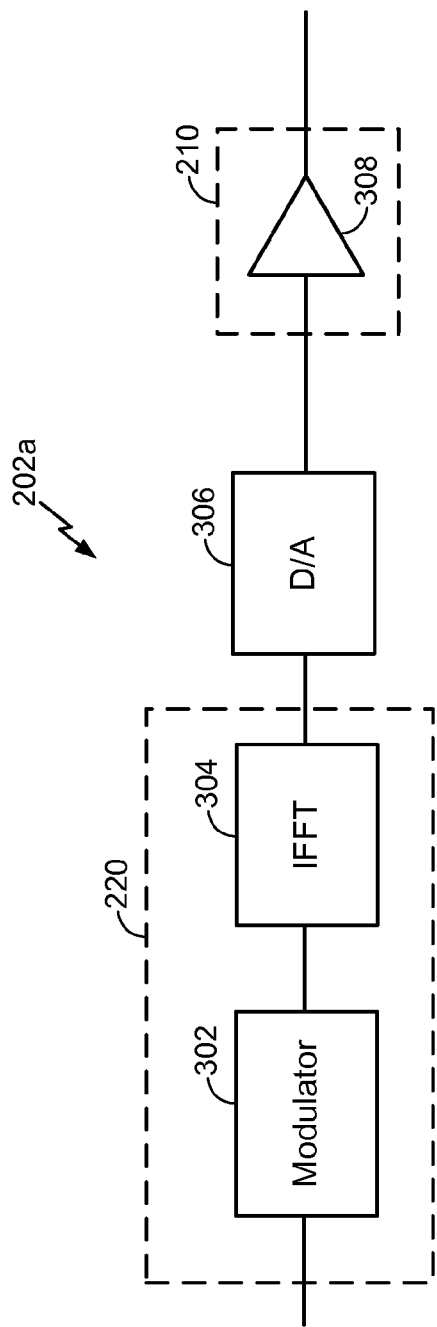
FIG. 3 illustrate various components that the wireless device shown in FIG. 2 may utilize to transmit wireless communications in accordance with the deferral mechanism for improved medium reuse described herein.

As discussed above, the wireless device 202 may comprise an AP 104, an STA 106, or an STA 106 implementing or otherwise performing the functions of an AP 104 to transmit and/or receive communications in a wireless network. According to one aspect of the invention, FIG. 3 therefore illustrates various components that the wireless device 202 shown in FIG. 2 may utilize to transmit wireless communications in accordance with the deferral mechanism for improved medium reuse described herein. For example, in one embodiment, the components illustrated in FIG. 3 may be used to transmit OFDM communications. For ease of reference, the wireless device 202 having the components illustrated in FIG. 3 is hereinafter referred to as a wireless device 202a.

In one embodiment, the wireless device 202a may comprise a modulator 302 configured to modulate bits for transmission. For example, the modulator 302 may map bits received in codewords from the processor 204 or the user interface 222 to a plurality of symbols according to a constellation, wherein the bits received from the processor 204 or the user interface 22 may correspond to user data or control information. In one embodiment, the modulator 302 may comprise a quadrature amplitude modulation (QAM) modulator (e.g., a 16-QAM or 64-QAM modulator). In another embodiment, the modulator 302 may include a binary phase-shift keying (BPSK) modulator or a quadrature phase-shift keying (QPSK) modulator.

In one embodiment, the wireless device 202a may further include a transform module 304 configured to convert symbols, bits, or otherwise modulated information from the modulator 302 into a time domain. For example, as shown in FIG. 3, the transform module 304 may be implemented with an inverse fast Fourier transform (IFFT) module. Furthermore, although FIG. 3 illustrates the modulator 302 and the transform module 304 as being implemented in the DSP 220, those skilled in the art will appreciate that the modulator 302 and/or transform module 304 may be implemented in the processor 204 or another suitable element of the wireless device 202.

In one embodiment, as discussed above, the DSP 220 may be configured to generate a data unit for transmission. In various embodiments, the modulator 302 and the transform module 304 may be configured to generate a data unit comprising a plurality of fields, wherein the plurality of fields may include control information and one or more data symbols. For example, the fields that include the control information may include one or more training fields and one or more signal (SIG) fields, wherein each training field may include a certain bit or symbol sequence and each SIG field may include information about the data unit (e.g., a length or data rate description).

In one embodiment, the DSP 220 may be configured to insert the one or more training fields between the one or more data symbols. For example, in one embodiment, the DSP 220 may determine a position or location of the one or more training fields in the data unit based on information received from the processor 204 and/or information stored in the memory 206 or a portion of the DSP 220. In one embodiment, the wireless device 202a may further include a digital to analog (D/A) converter 306 configured to convert the output of the transform module 304 into an analog signal. For example, the time-domain output of the transform module 304 may be converted to a baseband OFDM signal by the D/A converter 306. In one embodiment, the D/A converter 306 may be implemented in the processor 204, the transceiver 214, a data transmit processor, or another suitable element of the wireless device 202a.

In one embodiment, the transmitter 210 may wirelessly transmit the analog signal, which may be further processed prior to transmission via the transmitter 210. For example, in one embodiment, the analog signal may be filtered or upconverted to an intermediate or carrier frequency prior to transmission via the transmitter 210. Furthermore, in one embodiment, the transmitter 210 associated with the wireless device 202a may include a transmit amplifier 308 (e.g., a low noise amplifier), which may amplify the analog signal prior to transmission via the transmitter 210. In one embodiment, the transmitter 210 may be configured to transmit one or more packets or data units in a wireless signal based on the analog signal, wherein the data units may be generated using the processor 204 and/or the DSP 220 using the modulator 302 and the transform module 304 discussed above. In one embodiment, the transmitter 210 may transmit the data units over a bandwidth of approximately 2.5 MHz, 1.25 MHz, or a lower frequency. When using such bandwidths, transmission of the data units may be performed over a relatively long time period. For example, a data unit having five-hundred bytes may be transmitted over a period of approximately eleven milliseconds, approximately sixteen times slower than comparable transmissions implemented pursuant to the 802.11ac standard over bandwidths of approximately 20 MHz.

Figure 4:
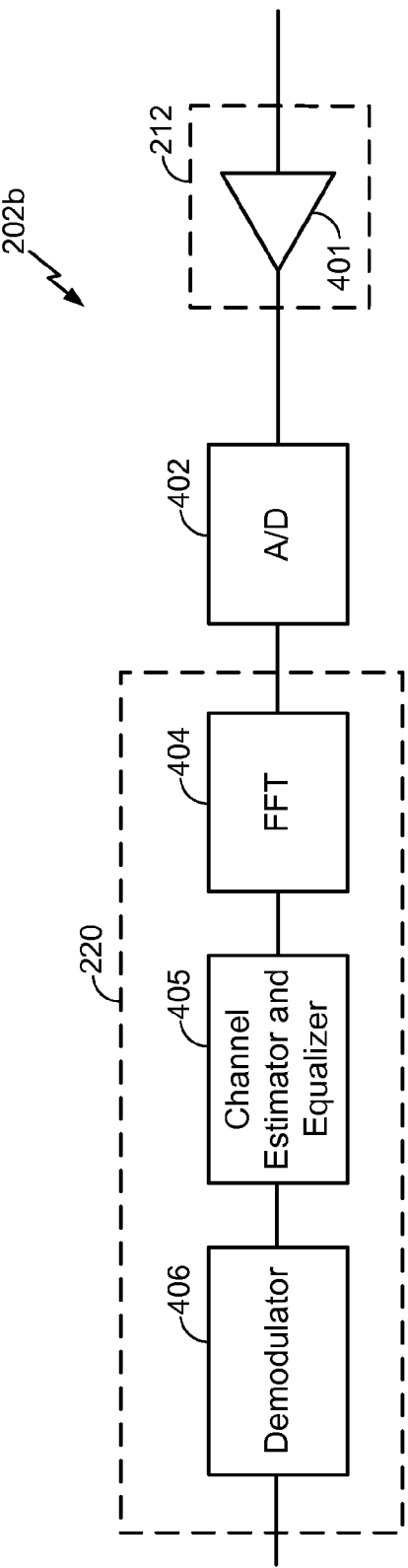
FIG. 4 illustrates various components that the wireless device shown in FIG. 2 may utilize to receive wireless communications in accordance with the deferral mechanism for improved medium reuse described herein.

According to one aspect of the invention, FIG. 4 illustrates various components that the wireless device 202 shown in FIG. 2 may utilize to receive wireless communications in accordance with the deferral mechanism for improved medium reuse described herein. For example, in one embodiment, the components illustrated in FIG. 4 may be used to receive OFDM communications and/or data units transmitted via the components discussed above with respect to FIG. 3. For ease of reference, the wireless device 202 having the components illustrated in FIG. 4 is hereinafter referred to as a wireless device 202b.

In one embodiment, the wireless device 202b may include a receiver 212 configured to receive one or more packets or data units in a wireless signal. Data units that may be received, decoded, or otherwise processed as discussed herein are described in additional detail with respect to FIGS. 5-9. In one embodiment, the receiver 212 is configured to receive the data units over bandwidths of approximately 2.5 MHz, 1.25 MHz, or a lower frequency. When using such bandwidths, the data units may be received over a relatively long time period. For example, a data unit having five-hundred bytes may be received over an approximately eleven millisecond time period. During this time, the channel over which the data units are received may change. For example, conditions of the channel may change due to movement of the wireless device 202b or a device transmitting the data units, or due to weather or other environmental conditions (e.g., various obstacles to communication). In such circumstances, information near the end of the data units may not be correctly decoded if the wireless device 202b uses settings determined at the time that reception of the data units began. However, as will be described in further detail below, the wireless device 202b may use the training fields interposed between one or more data symbols to update an estimate of the channel in order to properly decode the data symbols.

In one embodiment, the receiver 212 associated with the wireless device 202b may include a receive amplifier 401 (e.g., a low noise amplifier) configured to amplify the wireless signal received via the receiver 212, which may adjust the gain of the receive amplifier 401 using an automatic gain control (AGC) procedure. For example, in one embodiment, the AGC procedure may use information in one or more training fields associated with a received data unit, such as a received short training field (STF), to adjust the gain. Those skilled in the art will understand various techniques and mechanisms that may be used to perform the AGC procedure.

In one embodiment, the wireless device 202b may include an analog to digital (A/D) converter 402 configured to convert the amplified wireless signal from the receiver 212 into a digital representation thereof. Furthermore, in one embodiment, the wireless signal may be processed prior to being amplified or otherwise converted via the A/D converter 402. For example, the wireless signal may be filtered or downconverted to an intermediate or baseband frequency prior to being amplified or otherwise converted via the A/D converter 402. In one embodiment, the A/D converter 402 may be implemented in the processor 204, the transceiver 214, a data receive processor, or another suitable element of the wireless device 202. In one embodiment, the wireless device 202b may further include a transform module 404 configured to convert the representation the wireless signal into a frequency spectrum. For example, as shown in FIG. 4, the transform module 404 may be implemented with a fast Fourier transform (PET) module. In one embodiment, the transform module 404 may identify a symbol for each point used therein.

Additionally, in one embodiment, the wireless device 202b may include a channel estimator and equalizer 405 configured to form an estimate of the channel over which the data units are received and further configured to remove certain effects that the channel may have on the received data units based on the channel estimate. For example, the channel estimator and equalizer 405 may be configured to approximate a function of the channel and apply an inverse of that function to the data in the frequency spectrum. In one embodiment, the channel estimator and equalizer 405 may use information in one or more received training fields, such as a long training field (LTF), to estimate the channel. The channel estimate may be formed based on one or more LTFs received at the beginning of the data unit and may thereafter be used to equalize data symbols that follow the one or more LTFs. In one embodiment, after a certain time period or a certain number of data symbols, one or more additional LTFs may be received in the data unit. The channel estimate may then be updated or a new estimate formed using the additional LTFs, wherein the new or updated channel estimate may be used to equalize data symbols that follow the additional LTFs and/or re-equalize data symbols preceding the additional LTFs. Those skilled in the art will understand various techniques and mechanisms that may be used to form the channel estimate.

In one embodiment, the wireless device 202b may further include a demodulator 406 configured to demodulate the equalized data. For example, the demodulator 406 may reverse a mapping of bits to a symbol in a constellation to determine a plurality of bits based on symbols output from the transform module 404 and the channel estimator and equalizer 405. The determined plurality of bits, which may correspond to codewords, may then be processed or evaluated using the processor 204 or used to display or otherwise output information to the user interface 222, thereby decoding data and/or information from the received data units. In one embodiment, the demodulator 406 may comprise a 16-QAM demodulator, a 64-QAM demodulator, a BPSK demodulator, or a QPSK demodulator. Although FIG. 4 illustrates a particular embodiment in which the transform module 404, the channel estimator and equalizer 405, and the demodulator 406 are illustrated in the DSP 220, those skilled in the art will appreciate that the transform module 404, the channel estimator and equalizer 405, and the demodulator 406 may be suitably implemented in the processor 204 or another element of the wireless device 202b. Furthermore, as discussed above, the wireless signal received at the receiver 212 may generally include one or more data units, wherein the data units or data symbols contained therein may be decoded, evaluated, or otherwise processed using the components and functions described above. For example, in one embodiment, the processor 204 and/or the DSP 220 may be used to decode data symbols in the data units using the transform module 404, the channel estimator and equalizer 405, and the demodulator 406.

As discussed above, data units exchanged between the AP 104 and the STAs 106 may include control information or data. At a physical (PHY) layer, a particular one of the data units may be referred to as a PPDU, which may also be referred to as a packet, a physical layer packet, a data frame, or other suitable terminology. In one embodiment, each PPDU may comprise a preamble and a payload, wherein the preamble may include training fields and a SIG field and the payload may comprise a Media Access Control (MAC) header and other suitable data transmitted using one or more data symbols. According to one embodiment, the systems, methods, and devices described herein may utilize data units with training fields that are also interposed between data symbols in the payload to provide the deferral mechanism for improved medium reuse in wireless networks with transmit power imbalances that will now be described in further detail.

Figure 5:
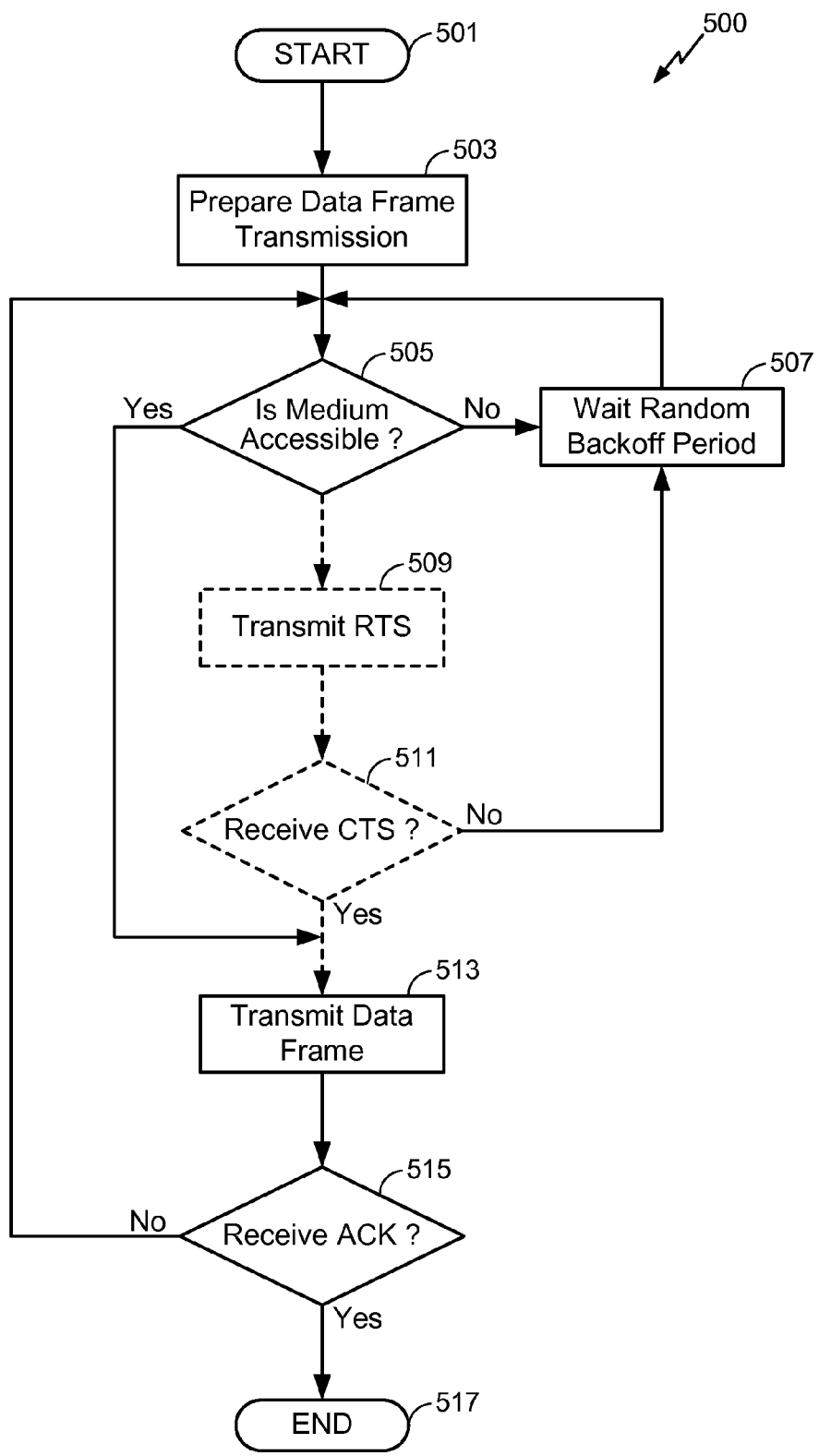
FIG. 5 illustrates an exemplary process whereby a wireless node attempts transmission in a standard CSMA network with collision avoidance.

More particularly, FIG. 5 illustrates an exemplary process 500 whereby a wireless node may attempt transmission in a standard CSMA network with collision avoidance. In response to the process 500 starting at block 501, the process 500 may move to block 503 where a wireless node may prepare a data frame for transmission on a shared medium (e.g., using the components and functions described above with reference to FIG. 3). In one embodiment, at block 505, the wireless node runs a CCA algorithm to detect whether the shared medium is available or otherwise accessible for the wireless node to send the data frame transmission. For example, as previously discussed, the CCA algorithm may be used to detect a PHY preamble or detect energy on the air to detect the start of a packet being transmitted on the medium.

In one embodiment, to detect whether the shared medium is free or otherwise available, block 505 may include a determination relating to whether or not the network uses virtual carrier sense, in which case the wireless node may transmit an RTS frame to a receiving node at block 509 and subsequently determine whether a CTS frame has been received from the receiving node at block 511. In one embodiment, in response to the wireless node determining that a CTS frame was received from the receiving node at block 511, the wireless node may determine that the shared medium is clear to send and therefore transmit the data frame over the shared medium at block 513. On the other hand, if the wireless node does not receive the CTS frame at block 511, the wireless node may determine that the shared medium is busy or otherwise unavailable to transmit the data frame at that time, in which case the wireless node may wait a random backoff period at block 507 prior to again sensing whether the shared medium is free or otherwise available to transmit the data frame at block 505.

In one embodiment, in response to block 505 resulting in a determination that the network does not use virtual carrier sense, the wireless node may run the CCA algorithm to determine whether the shared medium is free or otherwise available for a Distributed Inter Frame Space (DIFS) time interval. In one embodiment, in response to determining that the shared medium has been free for the DIFS time interval associated with the CCA algorithm at block 505, the wireless node may then transmit the data frame at block 513. Alternatively, in response to the wireless node determining that the shared medium is busy or otherwise sensing a transmission during the DIFS time interval, the wireless node may defer its transmission until the current transmission ends and then wait an additional DIFS time interval at block 507. Additionally, at block 507, the wireless node may wait a random backoff period chosen from within a predefined contention window, wherein the wireless node may decrement a timer corresponding to the random backoff period each time that the medium is sensed to be idle for a DIFS time interval. Furthermore, at block 507, the wireless node may freeze the timer whenever a transmission is detected on the medium and resume decrementing the timer when the medium is again sensed to be idle for a DIFS time interval. In either case, in response to the timer corresponding to the random backoff period reaching zero, the wireless node may transmit the data frame at block 513. In one embodiment, additional detail relating to functions that may be performed block 513 to transmit the data frame, whether in a network that uses virtual carrier sense or a network that does not virtual carrier sense, is described in greater detail below with respect to FIG. 8.

In one embodiment, subsequent to transmitting the data frame at block 513, whether in a network that uses virtual carrier sense or a network that does not virtual carrier sense, the wireless node may then wait at block 515 to receive an acknowledgement message from the receiving node indicating that the data frame was successfully received (e.g., a CTS message, an ACK message, etc.). In one embodiment, if the wireless node does not receive the acknowledgement from the receiving node after waiting at block 515 for a certain time period, the wireless node may again sense whether the shared medium is free or otherwise accessible at block 505, in this case to attempt retransmission of the data frame. However, if the wireless node receives the acknowledgement from the receiving node at block 515 prior to the time period expiring, the wireless node may determine that the data frame was successfully transmitted and the process 500 may end at block 517. Furthermore, those skilled in the art will appreciate that blocks 505 and 507 (and blocks 509 and 511 in the case of a network that uses virtual carrier sense) implement collision avoidance features whereby the wireless node defers transmitting the data frame if the shared medium is busy and waits the random backoff period before again attempting to sense whether the shared medium is free or busy in order to resolve contention between different nodes trying to access the shared medium at the same time.

Figure 6:
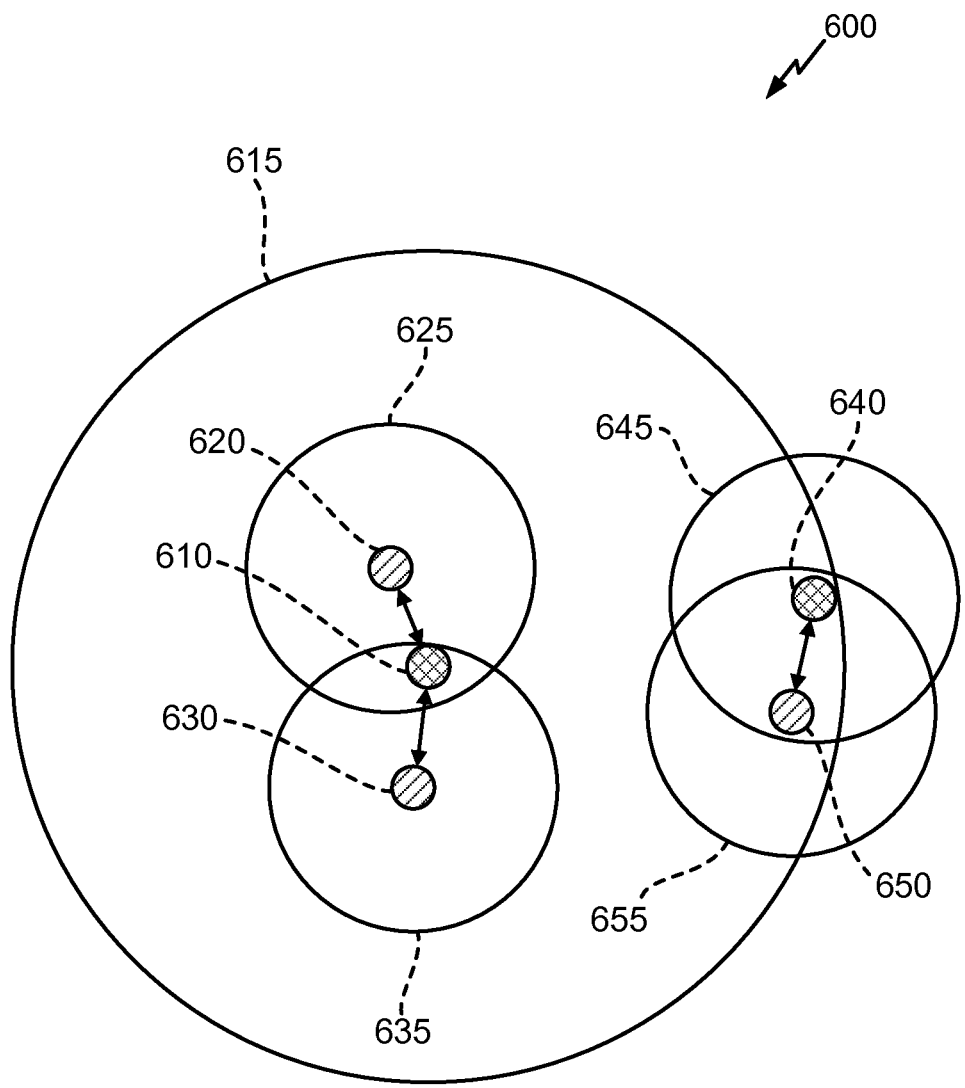
FIG. 6 illustrates an exemplary CSMA wireless network with multiple wireless stations concurrently accessing one or more wireless access points.

According to one aspect of the invention, FIG. 6 illustrates an exemplary CSMA wireless network 600 with multiple wireless STAs concurrently accessing one or more wireless APs. In particular, the exemplary CSMA wireless network 600 shown in FIG. 6 may include a high power AP 610 having a range corresponding to the large circle 615 centered at the high power AP 610 and a low power AP 640 having a smaller range corresponding to the circle 645 centered at the low power AP 640. Furthermore, the CSMA wireless network 600 may include low power STA 620 and low power STA 630 that are accessing high power AP 610, wherein the range of the low power STA 620 and the range of the low power STA 630 respectively correspond to the circle 625 and the circle 635. Additionally, the CSMA wireless network 600 may include low power STA 650 accessing low power AP 640, wherein the range of the low power STA 650 corresponds to the circle 655 centered at the low power STA 650. As shown in FIG. 6, the low power STA 650 falls within the large circle 615 corresponding to the range of the high power AP 610 and is therefore within the range of the high power AP 610. Accordingly, the low power STA 650 will sense transmissions sent from the high power AP 610 when attempting to access the medium to communicate with the low power AP 640 and consequently defer sending transmissions on the medium as long as the high power AP 610 is transmitting on the medium.

However, the high power AP 610 does not fall within the circle 655 corresponding to the range of the low power STA 650, whereby the high power AP 610 is not within the range of the low power STA 650 and defer to transmissions sent from the low power STA 650 because the high power AP 610 cannot sense transmissions that have a range limited to circle 655. Furthermore, the low power STA 650 and the low power AP 640 are attempting to communicate independently from than the high power AP 610, wherein any transmissions between the low power STA 650 and the low power AP 640 would not cause collisions at the high power AP 610 since the high power AP 610 is not within the range corresponding to either of circle 645 or circle 655. As such, the low power AP 640 will similarly sense transmissions sent from the high power AP 610 and therefore unnecessarily defer sending transmissions to the low power STA 650. Accordingly, the medium in the CSMA wireless network 600 could be used more effectively if the low power STA 650 and the low power AP 640 could use a medium reuse deferral mechanism that advantageously employs modified CCA algorithms to enable the low power STA 650 and the low power AP 640 (or any other node within a suitable range) to send transmissions to one another despite sensing the transmissions from the high power AP 610 on the medium.

Figure 7:
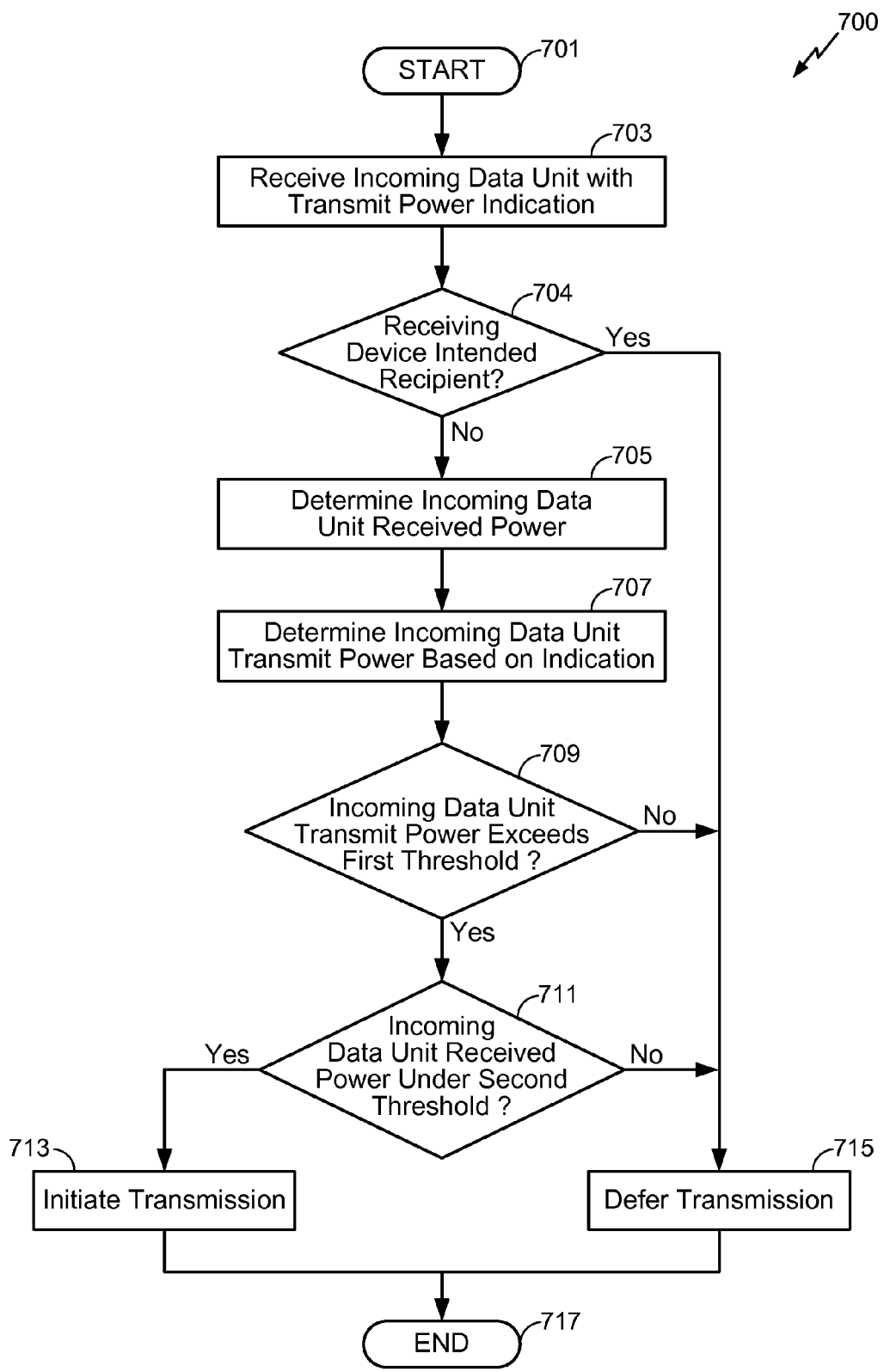
FIG. 7 illustrates an exemplary method for sensing whether a shared medium in a CSMA network is available in accordance with the deferral mechanism for improved medium reuse described herein.

For example, according to one aspect of the invention, FIG. 7 illustrates an exemplary method 700 for sensing whether a shared medium is available in accordance with a deferral mechanism for improved medium reuse in a wireless network (e.g., a CSMA network) with transmit power imbalances. In one embodiment, the method 700 may begin at block 701 to replace the standard CCA algorithm corresponding to block 505 in FIG. 5. Accordingly, in one embodiment, the method 700 shown in FIG. 7 may be optionally used in a network with virtual carrier sensing to further decrease the chances of collision. In one embodiment, the method 700 may include a wireless node receiving an incoming data unit with information that indicates the transmit power associated with the received incoming data unit at block 703. In particular, the incoming data unit may generally comprise an incoming packet that has been modified to include information indicating the power used to transmit the data unit by a sending node from which the packet originated. In one embodiment, the modification to the data unit may include one or more bits added to the SIG field in the PHY preamble associated therewith to signal the power used to transmit the data unit. For example, a single bit may be used to represent whether a "high" or "low" power level was used to transmit the data unit (e.g., a logical zero if the transmit power was low or a logical one if the transmit power was high). Alternatively, in one embodiment, multiple bits may be added to the data unit to distinguish between additional power levels (e.g., high, medium, low, etc.) or to numerically indicate the transmit power level (e.g., a sequence of bits to represent a 20 dBm value indicating the transmit power level in decibels relative to one milliwatt).

In one embodiment, the bits added to the data unit to indicate the transmit power level may be included in the preamble rather than other portions of the data unit because the preamble is typically broadcast in a robust manner that enables all receiving nodes within suitable range to decode information contained therein. In contrast, if the bits indicating the transmit power level were built into the payload portion of the data unit, certain receiving nodes may not be able to decode the transmit power level, for example, due to higher transmission rates associated with the payload portion, and furthermore, because data unit payload portions may be transmitted directionally such that certain nodes may not receive the data unit payload portion. However, the information that indicates the transmit power level may be suitably added to other portions of the data unit that enable all receiving nodes to suitably decode the information. For example, in one embodiment, the information that indicates the transmit power level may be added to the MAC header or another suitable portion of the data unit and a CRC corresponding to the MAC header may be placed in the MAC header to ensure that the information indicating the transmit power level is reliable.

In one embodiment, in response to suitably receiving the incoming data unit having the transmit power indication at block 703, the receiving wireless node may determine whether it is the intended receiver of the incoming data unit at block 704. For example, in one embodiment, the wireless node may identify the intended receiver based on a full or partial Association ID (AID) or other suitable address that the incoming data unit contains to identify an STA and thereby deliver data frames thereto. In another example, the wireless node may identify the intended receiver based on a waveform type or a transmission parameter of the waveform (e.g., the wireless node may not be the intended receiver if the waveform corresponds to a 2 MHz transmission). In one embodiment, if the wireless node determines that it is the intended receiver at block 704, the wireless node may defer sending a transmission on the medium at block 715 (e.g., to instead process the incoming data unit directed thereto). On the other hand, the wireless unit may drop a remaining portion of the incoming data unit at block 704 if the wireless node determines that it is not the intended receiver, wherein the dropped portion may include any portion of the incoming data unit beyond the preamble that includes the indication of transmit power and/or any portion referenced to identify the intended receiver. Accordingly, dropping any portions of incoming data units for which the wireless node is not the intended receiver other than that needed to identify the transmit power and intended receiver associated therewith may enable the wireless node to avoid processing the remaining portion of the data unit and thereby save power and transmit on the medium sooner because the remaining portion of the data unit does not have to be processed, which may further increase the reuse of the medium.

In one embodiment, if the wireless node determines that it is not the intended receiver at block 704, the wireless node may then determine the received power of the incoming data unit at block 705. For example, in one embodiment, the received power of the incoming data unit may generally correspond to the power level that the sending node used to transmit the data unit minus a path loss that represents a reduction in power density as a signal carrying the data unit propagates through the medium over which the data unit is transmitted. In one embodiment, the wireless node may then determine the transmit power of the incoming data unit at block 707 based on the information in the modified data unit that indicates the transmit power. For example, as noted above, the modified data unit may include an additional bit set to '1' to indicate that a high transmit power was used or '0' to indicate that a "low" transmit power was used, or vice versa. Furthermore, as previously discussed, the modified data unit may include one or more additional bits in the header that are dedicated to indicating the transmit power level at different granularities.

In one embodiment, the wireless node may then compare the incoming data unit transmit power determined in block 707 to a first threshold. For example, in one embodiment, the first threshold may comprise the transmit power associated with the wireless node that received the incoming data unit, in which case block 709 may comprise the receiving wireless node comparing the transmit power indicated in the incoming data unit to the transmit power associated with the receiving wireless node. In one embodiment, in response to the wireless node determining that the transmit power of the incoming data unit exceeds the transmit power of the wireless node (e.g., where the transmit power of the incoming data unit is "high" and the transmit power of the wireless node is "low"), the wireless node may compare the received power of the incoming data unit to a second threshold, as will be described in greater detail below. However, in one embodiment, the wireless node may defer sending a transmission on the medium at block 715 in response to determining that the transmit power of the incoming data unit does not exceed the transmit power of the wireless node (e.g., where the transmit power of the incoming data unit is "low" and the transmit power of the wireless node is "high" or where the transmit power of the incoming data unit and the wireless node are the same).

In one embodiment, as noted above, the wireless node may compare the received power of the incoming data unit to a second threshold at block 711 if the transmit power of the incoming data unit exceeds the transmit power of the wireless node. For example, in one embodiment, the second threshold may comprise a value corresponding to a standard CCA threshold added to a difference between the transmit power indicated in the incoming data unit and the transmit power of the receiving wireless node. As such, the second threshold would be equal to the standard CCA threshold if the sending node that transmitted the data unit and the wireless node that received the incoming data unit use the same transmit power. In one embodiment, where the one or more bits in the modified header associated with the incoming data unit and/or the receiving wireless node have non-numeric power levels (e.g., "high" or "low"), the wireless node may assign suitable numeric values to the non-numeric power levels in order to calculate the second threshold used in block 711. For example, in one embodiment, the wireless node may set a "low" power level to zero (0) dBm and a "high" power level to twenty (20) dBm, although those skilled in the art will appreciate that other suitable values may be used. Accordingly, if the standard CCA threshold was ten (10) dBm, then the second threshold would be 10 dBm+(20 dBm−0 dBm)= 30 dBm. The modified CCA threshold may then be compared to the received power of the incoming data unit at block 711, wherein the wireless node may initiate the transmission at block 713 if the received power of the incoming data unit is less than the modified CCA threshold, or alternatively defer the transmission if the received power of the incoming data unit is equal to or greater than the modified CCA threshold.

As such, increasing the standard CCA threshold according to the difference between the transmit power indicated in the incoming data unit and the transmit power of the receiving wireless node may increase the likelihood that the wireless node will be able to initiate the transmission at block 713 rather than having to defer the transmission at block 715 relative to using the standard CCA threshold. Consequently, increasing the standard CCA threshold may further increase the likelihood that the wireless node may be permitted to transmit on the medium despite sensing other transmissions and therefore increase the overall utilization of the medium without causing collisions. Furthermore, permitting the wireless node to transmit on the medium based on the first and second threshold despite possibly sensing other transmissions on the medium may differ from techniques that wireless nodes in standard CSMA networks with collision avoidance typically use. For example, referring back to FIG. 6, if the low power STA 650 were to use method 700, the low power STA 650 may choose to transmit to the low power AP 640 despite receiving packets from the high power AP 610 and thereby increase the reuse of the medium (although the low power STA 650 may decide to defer nonetheless as part of rate adaptation if the low power STA 650 determines that the transmission may not be successful due to existing concurrent packets on the air). In either case, whether the wireless node suitably initiates the transmission at block 713 or chooses to defer the transmission at block 715, the method 700 then ends at block 717.

Figure 8:
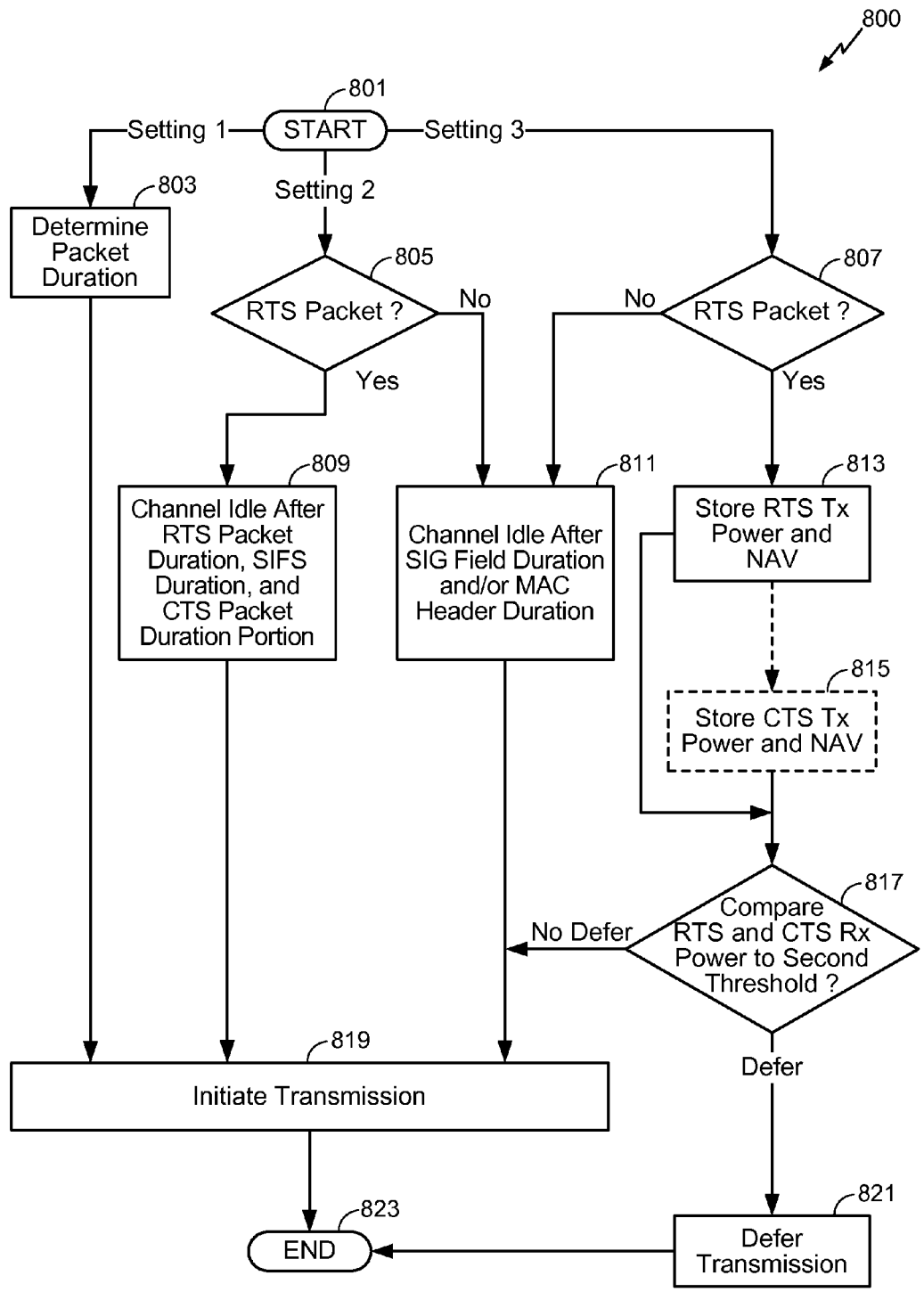
FIG. 8 illustrates an exemplary method whereby a wireless node attempts transmission in a standard CSMA network with collision avoidance in accordance with the deferral mechanism for improved medium reuse described herein.

According to one aspect of the invention, FIG. 8 illustrates another exemplary method 800 whereby a wireless node attempts transmission in a wireless network (e.g., a CSMA network) with collision avoidance in accordance with the deferral mechanism for improved medium reuse described herein. In one embodiment, the method 800 may begin at block 701 to replace the techniques used to transmit a data frame corresponding to block 513 in FIG. 5. Alternatively (or additionally), the method 800 shown in FIG. 8 may occur subsequent to a wireless node determining that a shared medium is free or otherwise available, as described herein. In one embodiment, block 801 initially comprises the wireless node selecting among three possible techniques to transmit the data frame, although this is not meant to be limiting in that more or fewer techniques may be utilized within the framework described herein.

In one embodiment, the first technique may include the wireless node determining a duration or other suitable length corresponding to an incoming packet received at the wireless node via a receiver at block 803. For example, in one embodiment, one or more bits in a SIG field of the incoming packet may indicate the duration or length of the incoming packet. Accordingly, in the first technique, the wireless node may immediately consider a channel over which the incoming packet was received to be available for at least the duration of the incoming packet and initiate the transmission at block 819. For example, in one embodiment, block 819 may include a transmitter of the wireless node beginning to transmit the data frame over the channel or medium when the channel is considered available and continue to transmit over the channel or medium for at most a time period the channel is considered to be available, which in the first technique may correspond to the duration of the incoming packet. In one embodiment, the wireless may alternatively (or additionally) continue to transmit over the channel or medium or for any suitable time period over which the channel is considered available (e.g., if the wireless node does not sense any transmissions on the channel after the duration of the incoming packet has ended, the channel may still be considered available and the wireless node may therefore continue to transmit). In response to suitably completing the transmission, the method 800 may end at block 823.

In one embodiment, the second technique may include the wireless node determining whether the incoming packet is an RTS packet at block 805. For example, in one embodiment, one or more bits in the SIG field of the incoming packet may indicate whether the packet has an RTS type, a CTS type, or another suitable type. In another example, the one or more bits that indicate the duration of the incoming packet may further indicate whether the packet has the RTS type. In one embodiment, packets with the RTS type may generally have a maximum duration when sent at a minimum bit rate, wherein the duration of the incoming packet may be compared to the maximum duration of RTS type packets. As such, the wireless node may determine that the incoming packet is an RTS packet in block 805 if the duration of the incoming packet indicated via the one or more bits in the SIG field is less than or equal to the maximum duration of RTS type packets, or alternatively if one or more bits in a MAC header of the incoming packet indicate that the packet has the RTS type.

In one embodiment, in response to the wireless node determining that the incoming packet has the RTS type, block 809 may include the wireless node considering the channel over which the incoming packet was received to be available after a time equivalent to the duration of the RTS packet, a Short Interframe Space (SIFS) duration, and/or a beginning portion of a CTS packet duration. Furthermore, in one embodiment, the wireless node may detect the CTS packet during a time in which the wireless node may be waiting for the channel to be considered available, in which case the wireless node may evaluate the CTS packet subject to process 500, method 700, and/or method 800 as described herein. As such, in one embodiment, the wireless node may consider the channel over which the incoming packet was received to be available for at least the duration of the CTS packet subsequent to the beginning portion, which may be indicated and determined in a substantially similar manner to that described above with respect to block 803. For example, the SIFS duration refers to a time interval between the transmitting node sending the RTS packet and receiving the CTS packet or other acknowledgement message in response thereto, wherein the SIFS interval may enable the transmitting node to switch from transmitting mode to receiving mode and thereby suitably decode the CTS packet and enable an AP or STA to have prioritized access to the channel to send the CTS packet after the SIFS duration expires. Accordingly, the wireless node may consider the channel busy until after the duration associated with the RTS packet, the SIFS, and the beginning portion of the CTS packet duration to avoid contention with the prioritized access given to the AP or STA sending the CTS packet.

In one embodiment, in response to the wireless node determining that the incoming packet does not have the RTS type (e.g., where the incoming packet has the CTS type or a CTS packet is received while waiting for the channel to be considered available), the wireless node may consider the channel over which the incoming packet was received to be available after a time equivalent to the duration of the SIG field in the incoming RTS packet and/or the MAC header of the incoming RTS packet at block 811. In one embodiment, the wireless node may consider the channel over which the incoming packet was received to be available for at least the duration of the incoming RTS packet, which may be indicated and determined in a substantially similar manner to that described above with respect to block 803.

In one embodiment, after the time period determined in block 809 and/or block 811 has passed and the wireless node considers the channel over which the incoming packet was received to be available, the wireless node may initiate the transmission at block 819. For example, in one embodiment, block 819 may include the transmitter of the wireless node beginning to transmit the data frame over the channel or medium when the channel is considered available and continue to transmit over the channel or medium for at most the time period the channel is considered to be available, which in the second technique may correspond to the time determined in block 809 or 811. Alternatively, in one embodiment, the wireless node may continue to transmit over the channel or medium or for any suitable time period over which the channel is considered available. In response to suitably completing the transmission, the method 800 may end at block 823.

In one embodiment, the third technique may include the wireless node determining whether the incoming packet is an RTS packet at block 807, which may be performed in a substantially similar manner to that described above with respect to block 805. For example, one or more bits in the SIG field of the incoming packet may indicate whether the packet has the RTS type, the CTS type, or another suitable type and/or a duration of the incoming packet that can be used in comparison to the maximum duration of RTS type packets. As such, the wireless node may determine that the incoming packet is an RTS packet in block 807 if the duration of the incoming packet indicated via the one or more bits in the SIG field is less than or equal to the maximum duration of RTS type packets, or alternatively if one or more bits in a MAC header of the incoming packet indicate that the packet has the RTS type.

In one embodiment, in response to the wireless node determining that the incoming packet has the RTS type, block 813 may include the wireless node storing the transmit power and/or the received power of the incoming packet and storing a NAV of the incoming packet, wherein the NAV may generally indicate the duration of a subsequent packet to be transmitted from a wireless node that transmitted the incoming packet subsequent to the transmitting node successfully receiving a CTS packet. In one embodiment, block 815 may include the wireless node then waiting a set amount of time to receive a potential CTS packet and storing the transmit power of the CTS packet and/or the received power of the CTS packet in addition to the NAV of the CTS packet if the CTS packet is received by the wireless node. In one embodiment, the NAV of the CTS packet may be similar to the NAV of the incoming packet, indicating the duration of a data packet to be transmitted following successful receipt of the CTS packet by a wireless node that transmitted the incoming packet.

In one embodiment, the wireless node may then compare the transmit power and/or the received power of the incoming packet to a second threshold in response to receiving and processing the CTS packet, or alternatively if no CTS packet has been received within a suitable time period. In one embodiment, the transmit power and the received power may be determined as described above with respect to block 703 and block 705 in FIG. 7, respectively. Furthermore, in one embodiment, the second threshold used in block 817 may be the standard CCA threshold or the modified CCA threshold described above with respect to block 711 in FIG. 7. For example, in one embodiment, the modified CCA threshold may be equal to the standard CCA threshold if the wireless node that transmitted the incoming data unit and the wireless node that received the incoming data unit use the same transmit power. In addition, the wireless node may compare the transmit power and/or the received power of the CTS packet to the second threshold. In one embodiment, in response to determining that the transmit power and/or the received power of the incoming packet and that the transmit power and/or the received power of the CTS packet are less than the second threshold, then the wireless node may transmit the data frame in block 819. For example, in one embodiment, the wireless node may consider the channel available immediately and for the NAV duration. However, if the transmit power and/or the received power of the incoming packet or the transmit power and/or the received power of the CTS packet is greater than or equal to the second threshold, then the wireless node may defer transmission of the data frame at block 821, in which case the wireless node may consider the channel to not be available and set or reset the NAV such that the wireless node defers the transmission for at least the duration as indicated by the NAV.

Figure 9:
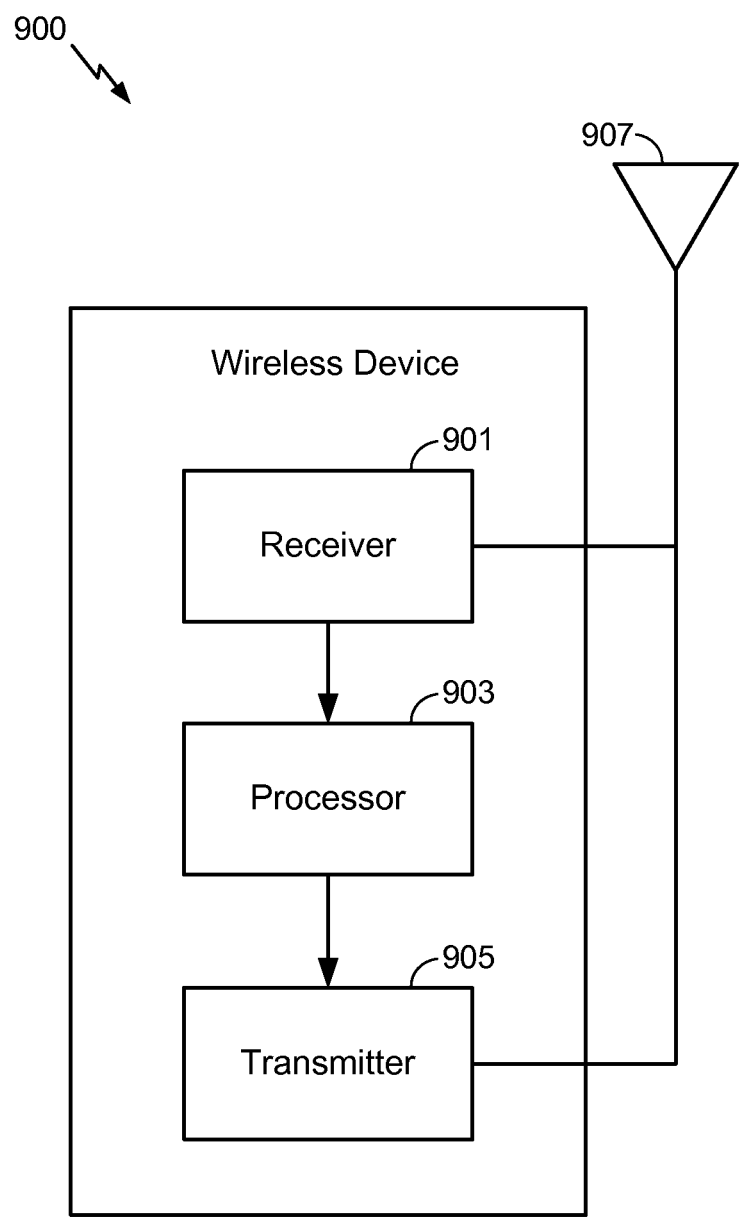
FIG. 9 illustrates a block diagram of an exemplary wireless device that may employ the deferral mechanism for improved medium reuse described herein.

According to one aspect of the invention, FIG. 9 illustrates a block diagram of an exemplary wireless device 900 that may employ the deferral mechanism for improved medium reuse in wireless networks with transmit power imbalances described herein. Those skilled in the art will appreciate that a wireless terminal may have more components than the simplified wireless device 900 illustrated in FIG. 9. The wireless device 900 includes only those components useful for describing certain prominent features of embodiments within the scope of the claims. Wireless device 900 includes a receiver 901, a processor 903, a transmitter 905 and an antenna 907. In one embodiment, wireless device 900 is configured to transmit data units in a CSMA network. In one embodiment, the wireless device may comprise means for sensing a data unit transmitted on a medium associated with the CSMA network, wherein the sensed data unit may include information that indicates a transmit power associated therewith. For example, in one embodiment, the means for sensing the data unit transmitted on the medium associated with the CSMA network may be the receiver 901.

In one embodiment, the wireless device 900 may further comprise means for determining a received power associated with the sensed data unit and means for determining the transmit power associated with the sensed data unit from the information in the sensed data unit that indicates the transmit power. For example, in one embodiment, the means for determining the received power and the transmit power associated with the sensed data unit may be the processor 903. In one embodiment, the wireless device 900 may further comprise means for comparing the transmit power associated with the sensed data unit to a first threshold and the received power associated with the sensed data unit to a second threshold. For example, in one embodiment, the means for comparing the transmit power and the received power associated with the sensed data unit to the first threshold and the second threshold respectively may be the processor 903.

In one embodiment, the wireless device 900 may further comprise means for initiating or deferring one or more transmissions on the medium associated with the CSMA network based on whether the transmit power associated with the sensed data unit exceeds the first threshold and the received power associated with the sensed data unit does not equal or exceed the second threshold and means for sending the one or more transmissions on the medium associated with the CSMA network if the transmit power associated with the sensed data unit exceeds the first threshold and the received power associated with the sensed data unit does not equal or exceed the second threshold. For example, in one embodiment, the means for initiating or deferring the one or more transmissions on the medium associated with the CSMA network may be the processor 903 and the means for sending the one or more transmissions on the medium associated with the CSMA network may be the transmitter 905. Furthermore, in one embodiment, the wireless device 900 may comprise means for dropping the sensed data unit subsequent to determining the transmit power associated with the sensed data unit if the transmit power associated with the sensed data unit exceeds the first threshold and the received power associated with the sensed data unit does not equal or exceed the second threshold, wherein the means for dropping the sensed data unit may be the processor 903.

In one embodiment, the wireless device 900 may further comprise means for determining that one or more of a SIG field associated with the sensed data unit, a MAC header associated with the sensed data unit, or a duration associated with the sensed data unit indicate that the sensed data unit comprises an RTS packet, means for sensing a CTS message on the medium associated with the CSMA network, storing a network allocation vector (NAV) included in the sensed data unit, a received power associated with the sensed CTS message, and a NAV included in the sensed CTS message, and means for initiating the one or more transmissions on the medium associated with the CSMA network in the time period when the medium is available if the received power associated with the sensed data unit does not equal or exceed the second threshold and the received power associated with the sensed CTS message does not equal or exceed the second threshold. For example, in one embodiment, the means for determining that the sensed data unit comprises an RTS packet may be the processor, the means for sensing the CTS message on the medium may be the receiver 901, the means for storing the received power associated with the sensed CTS message and the NAV included in the sensed data unit and the sensed CTS message may the processor 903, and the means for initiating the transmissions if the received power associated with the sensed data unit and the sensed CTS message do not equal or exceed the second threshold may be the processor 903, which may initiate the transmissions via the transmitter 905.

Although the description provided above sets forth various structures and components associated with the wireless device 900 that may correspond to the various means, those skilled in the art will appreciate that the structures and components set forth above are exemplary only, and that other structures or components described herein may suitably correspond to the various means. For example, in one embodiment, various structures and components associated with the wireless device 202 shown in FIG. 2, the wireless device 202a shown in FIG. 3, the wireless device 202b shown in FIG. 4, or any other suitable structure or component described in the present disclosure or illustrated in the accompanying drawings may correspond to one or more of the means described above.

As used herein, the term "determining" may encompass various actions. For example, "determining" may include calculating, computing, processing, deriving, investigating, looking up (e.g., in a table, a database, a data structure, etc.), ascertaining, and the like. Furthermore, "determining" may include receiving (e.g., receiving information), accessing (e.g., accessing data in a memory), and the like, and/or resolving, selecting, choosing, establishing, and the like. Further, a "channel width" as used herein may encompass or may also be referred to as a bandwidth in certain aspects.

As used herein, any phrases referring to "at least one of" or "one or more of" a list of items refers to any combination of those items, including single members. As an example, "one or more of a, b, or c" is intended to cover: a, b, c, a-b, a-c, b-c, and a-b-c. Furthermore, the word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage, or operational mode, in that the terminology used herein is provided to describe particular embodiments only and is not intended to limit any embodiments of the invention. As used herein, the singular forms "a," "an," and "the" are intended to include the plural forms as well, unless the context clearly indicates otherwise. It will be further understood that the terms "comprises," "comprising," "includes," and/or "including" used herein specify the presence of stated features, integers, steps, operations, elements, and/or components, but do not preclude the presence or addition of one or more other features, integers, steps, operations, elements, components, and/or groups thereof.

The various operations of methods described above may be performed by any suitable means capable of performing the operations, such as various hardware and/or software component(s), circuits, and/or module(s). Generally, any operations illustrated in the drawings may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in various aspects computer-readable medium may comprise non-transitory computer-readable medium (e.g., tangible media). In addition, in various aspects computer-readable medium may comprise transitory computer-readable medium (e.g., a signal). Combinations of the above should also be included within the scope of computer-readable media.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as CD or floppy disk, etc.), such that a user terminal and/or base station can obtain the various methods upon coupling or providing the storage means to the device. Moreover, any other suitable technique for providing the methods and techniques described herein to a device can be utilized.

While the foregoing disclosure shows illustrative embodiments of the invention, those skilled in the pertinent art will appreciate that various changes and modifications could be made herein without departing from the scope or spirit of the invention, as defined by the appended claims. The functions, steps, operations, and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. An apparatus for wireless communication, comprising:
a receiver configured to sense a data unit transmitted on a medium associated with a carrier sense multiple access (CSMA) network, wherein the sensed data unit comprises information that indicates a transmit power associated with the sensed data unit; and
one or more processors configured to:
determine a received power and an intended receiver associated with the sensed data unit;
determine the transmit power associated with the sensed data unit from the information in the sensed data unit that indicates the transmit power; and
initiate one or more transmissions on the medium associated with the CSMA network if the apparatus is not the intended receiver associated with the sensed data unit, the transmit power associated with the sensed data unit exceeds a first threshold, and the received power associated with the sensed data unit does not equal or exceed a second threshold.

2. The apparatus of claim 1, wherein the one or more processors are configured to determine the intended receiver associated with the sensed data unit based on one or more of a waveform type, a waveform transmission parameter, or a full or partial identifier included in a PHY or MAC header of the sensed data unit.

3. The apparatus of claim 1, wherein the first threshold comprises a transmit power associated with the apparatus and the second threshold comprises a clear channel assessment threshold plus a difference between the transmit power associated with the sensed data unit and the transmit power associated with the apparatus.

4. The apparatus of claim 1, wherein the one or more processors are further configured to defer the one or more transmissions on the medium associated with the CSMA network if the transmit power associated with the sensed data unit does not exceed the first threshold or the received power associated with the sensed data unit equals or exceeds the second threshold.

5. The apparatus of claim 1, wherein the one or more processors are further configured to drop the sensed data unit subsequent to determining the transmit power associated therewith if the transmit power associated with the sensed data unit exceeds the first threshold and the received power associated with the sensed data unit does not equal or exceed the second threshold.

6. The apparatus of claim 1, wherein the information in the sensed data unit that indicates the transmit power associated therewith comprises one or more bits in a PHY or MAC preamble associated with the sensed data unit.

7. The apparatus of claim 1, further comprising a transmitter configured to send the one or more transmissions on the medium associated with the CSMA network in a time period when the medium associated with the CSMA network is available.

8. The apparatus of claim 7, wherein the sensed data unit further comprises a signal field or MAC header that indicates a duration associated with the sensed data unit and the time period when the medium is available comprises at least the duration indicated in the signal field or MAC header.

9. The apparatus of claim 7, wherein the sensed data unit further comprises a signal field having a first duration and a media access control header having a second duration, the signal field indicates a third duration associated with the sensed data unit, and the time period when the medium is available comprises at least a portion of the third duration after one or more of the first duration or the second duration.

10. The apparatus of claim 7, wherein the one or more processors are further configured to determine that one or more of a signal field associated with the sensed data unit, a media access control header associated with the sensed data unit, or a duration associated with the sensed data unit indicate that the sensed data unit comprises a request to send packet.

11. The apparatus of claim 10, wherein the time period when the medium is available begins after the duration associated with the sensed data unit, a Short Interframe Space duration, and at least a portion of a duration associated with a clear to send message.

12. The apparatus of claim 10, wherein:
the receiver is further configured to sense a clear to send (CTS) message on the medium associated with the CSMA network; and
the one or more processors are further configured to:
store a network allocation vector (NAV) included in the sensed data unit, a received power associated with the sensed CTS message, and a NAV included in the sensed CTS message; and
initiate the one or more transmissions on the medium associated with the CSMA network in the time period when the medium is available if the received power associated with the sensed data unit does not equal or exceed the second threshold and the received power associated with the sensed CTS message does not equal or exceed the second threshold.

13. The apparatus of claim 12, wherein time period when the medium is available comprises at least a duration indicated in the NAV included in one or more of the sensed data unit or the sensed CTS message.

14. The apparatus of claim 12, wherein the one or more processors are further configured to:
defer the one or more transmissions on the medium associated with the CSMA network for at least a first duration indicated in the NAV included in the sensed data unit if the received power associated with the sensed data unit equals or exceeds the second threshold; and
defer the one or more transmissions on the medium associated with the CSMA network for at least a second duration indicated in the NAV included in the sensed CTS message if the received power associated with the sensed CTS message equals or exceeds the second threshold.

15. A method for wireless communication with a wireless apparatus, comprising:
sensing, at a receiver associated with the wireless apparatus, a data unit transmitted on a medium associated with a carrier sense multiple access (CSMA) network, wherein the sensed data unit comprises information that indicates a transmit power associated with the sensed data unit;
determining, on a processor associated with the wireless apparatus, a received power and an intended receiver associated with the sensed data unit;
determining, on the processor associated with the wireless apparatus, the transmit power associated with the sensed data unit from the information in the sensed data unit that indicates the transmit power; and
initiating, via the processor associated with the wireless apparatus, one or more transmissions on the medium associated with the CSMA network if the wireless apparatus is not the intended receiver associated with the sensed data unit, the transmit power associated with the sensed data unit exceeds a first threshold, and the received power associated with the sensed data unit does not equal or exceed a second threshold.

16. The method of claim 15, wherein the intended receiver associated with the sensed data unit is determined based on one or more of a waveform type, a waveform transmission parameter, or a full or partial identifier included in a PHY or MAC header of the sensed data unit.

17. The method of claim 15, wherein the first threshold comprises a transmit power associated with the wireless apparatus and the second threshold comprises a clear channel assessment threshold plus a difference between the transmit power associated with the sensed data unit and the transmit power associated with the wireless apparatus.

18. The method of claim 15, further comprising deferring the one or more transmissions on the medium associated with the CSMA network if the transmit power associated with the sensed data unit does not exceed the first threshold or the received power associated with the sensed data unit equals or exceeds the second threshold.

19. The method of claim 15, further comprising dropping the sensed data unit subsequent to determining the transmit power associated therewith if the transmit power associated with the sensed data unit exceeds the first threshold and the received power associated with the sensed data unit does not equal or exceed the second threshold.

20. The method of claim 15, wherein the information in the sensed data unit that indicates the transmit power associated therewith comprises one or more bits in a PHY or MAC preamble associated with the sensed data unit.

21. The method of claim 15, further comprising sending the one or more transmissions on the medium associated with the CSMA network in a time period when the medium associated with the CSMA network is available via a transmitter associated with the wireless apparatus.

22. The method of claim 21, wherein the sensed data unit further comprises a signal field or MAC header that indicates a duration associated with the sensed data unit and the time period when the medium is available comprises at least the duration indicated in the signal field or MAC header.

23. The method of claim 21, wherein the sensed data unit further comprises a signal field having a first duration and a media access control header having a second duration, the signal field indicates a third duration associated with the sensed data unit, and the time period when the medium is available comprises at least a portion of the third duration after one or more of the first duration or the second duration.

24. The method of claim 21, further comprising determining that one or more of a signal field associated with the sensed data unit, a media access control header associated with the sensed data unit, or a duration associated with the sensed data unit indicate that the sensed data unit comprises a request to send packet.

25. The method of claim 24, wherein the time period when the medium is available begins after the duration associated with the sensed data unit, a Short Interframe Space duration, and at least a portion of a duration associated with a clear to send message.

26. The method of claim 24, further comprising:
sensing, at the receiver associated with the wireless apparatus, a clear to send (CTS) message on the medium associated with the CSMA network;
storing, in a memory associated with the wireless apparatus, a network allocation vector (NAV) included in the sensed data unit, a received power associated with the sensed CTS message, and a NAV included in the sensed CTS message; and initiating the one or more transmissions on the medium associated with the CSMA network in the time period when the medium is available if the received power associated with the sensed data unit does not equal or exceed the second threshold and the received power associated with the sensed CTS message does not equal or exceed the second threshold.

27. The method of claim 26, wherein time period when the medium is available comprises at least a duration indicated in the NAV included in one or more of the sensed data unit or the sensed CTS message.

28. The method of claim 26, further comprising:
deferring the one or more transmissions on the medium associated with the CSMA network for at least a first duration indicated in the NAV included in the sensed data unit if the received power associated with the sensed data unit equals or exceeds the second threshold; and
deferring the one or more transmissions on the medium associated with the CSMA network for at least a second duration indicated in the NAV included in the sensed CTS message if the received power associated with the sensed CTS message equals or exceeds the second threshold.

29. An apparatus for wireless communication, comprising:
means for sensing a data unit transmitted on a medium associated with a carrier sense multiple access (CSMA) network, wherein the sensed data unit comprises information that indicates a transmit power associated with the sensed data unit;
means for determining a received power and an intended receiver associated with the sensed data unit;
means for determining the transmit power associated with the sensed data unit from the information in the sensed data unit that indicates the transmit power; and
means for initiating one or more transmissions on the medium associated with the CSMA network if the apparatus is not the intended receiver associated with the sensed data unit, the transmit power associated with the sensed data unit exceeds a first threshold, and the received power associated with the sensed data unit does not equal or exceed a second threshold.

30. The apparatus of claim 29, wherein the means for determining the intended receiver associated with the sensed data unit determines the intended receiver based on one or more of a waveform type, a waveform transmission parameter, or a full or partial identifier included in a PHY or MAC header of the sensed data unit.

31. The apparatus of claim 29, wherein the first threshold comprises a transmit power associated with the apparatus and the second threshold comprises a clear channel assessment threshold plus a difference between the transmit power associated with the sensed data unit and the transmit power associated with the apparatus.

32. The apparatus of claim 29, further comprising means for deferring the one or more transmissions on the medium associated with the CSMA network if the transmit power associated with the sensed data unit does not exceed the first threshold or the received power associated with the sensed data unit equals or exceeds the second threshold.

33. The apparatus of claim 29, further comprising means for dropping the sensed data unit subsequent to determining the transmit power associated therewith if the transmit power associated with the sensed data unit exceeds the first threshold and the received power associated with the sensed data unit does not equal or exceed the second threshold.

34. The apparatus of claim 29, wherein the information in the sensed data unit that indicates the transmit power associated therewith comprises one or more bits in a PHY or MAC preamble associated with the sensed data unit.

35. The apparatus of claim 29, further comprising means for sending the one or more transmissions on the medium associated with the CSMA network in a time period when the medium associated with the CSMA network is available.

36. The apparatus of claim 35, wherein the sensed data unit further comprises a signal field or MAC header that indicates a duration associated with the sensed data unit and the time period when the medium is available comprises at least the duration indicated in the signal field or MAC header.

37. The apparatus of claim 35, wherein the sensed data unit further comprises a signal field having a first duration and a media access control header having a second duration, the signal field indicates a third duration associated with the sensed data unit, and the time period when the medium is available comprises at least a portion of the third duration after one or more of the first duration or the second duration.

38. The apparatus of claim 35, further comprising means for determining that one or more of a signal field associated with the sensed data unit, a media access control header associated with the sensed data unit, or a duration associated with the sensed data unit indicate that the sensed data unit comprises a request to send packet.

39. The apparatus of claim 38, wherein the time period when the medium is available begins after the duration associated with the sensed data unit, a Short Interframe Space duration, and at least a portion of a duration associated with a clear to send message.

40. The apparatus of claim 38, further comprising:
means for sensing a clear to send (CTS) message on the medium associated with the CSMA network;
means for storing a network allocation vector (NAV) included in the sensed data unit, a received power associated with the sensed CTS message, and a NAV included in the sensed CTS message; and
means for initiating the one or more transmissions on the medium associated with the CSMA network in the time period when the medium is available if the received power associated with the sensed data unit does not equal or exceed the second threshold and the received power associated with the sensed CTS message does not equal or exceed the second threshold.

41. The apparatus of claim 40, wherein time period when the medium is available comprises at least a duration indicated in the NAV included in one or more of the sensed data unit or the sensed CTS message.

42. The apparatus of claim 40, further comprising:
means for deferring the one or more transmissions on the medium associated with the CSMA network for at least a first duration indicated in the NAV included in the sensed data unit if the received power associated with the sensed data unit equals or exceeds the second threshold; and
means for deferring the one or more transmissions on the medium associated with the CSMA network for at least a second duration indicated in the NAV included in the sensed CTS message if the received power associated with the sensed CTS message equals or exceeds the second threshold.

43. A tangible computer-readable medium storing instructions, wherein executing the instructions on an apparatus cause the apparatus to:
sense a data unit transmitted on a medium associated with a carrier sense multiple access (CSMA) network, wherein the sensed data unit comprises information that indicates a transmit power associated with the sensed data unit;

determine a received power and an intended receiver associated with the sensed data unit;

determine the transmit power associated with the sensed data unit from the information in the sensed data unit that indicates the transmit power; and initiate one or more transmissions on the medium associated with the CSMA network if the apparatus is not the intended receiver associated with the sensed data unit, the transmit power associated with the sensed data unit exceeds a first threshold, and the received power associated with the sensed data unit does not equal or exceed a second threshold.

44. The tangible computer-readable medium of claim 43, wherein the intended receiver associated with the sensed data unit is determined based on one or more of a waveform type, a waveform transmission parameter, or a full or partial identifier included in a PHY or MAC header of the sensed data unit.

45. The tangible computer-readable medium of claim 43, wherein the first threshold comprises a transmit power associated with the apparatus and the second threshold comprises a clear channel assessment threshold plus a difference between the transmit power associated with the sensed data unit and the transmit power associated with the apparatus.

46. The tangible computer-readable medium of claim 43, wherein executing the instructions on the apparatus further cause the apparatus to defer the one or more transmissions on the medium associated with the CSMA network if the transmit power associated with the sensed data unit does not exceed the first threshold or the received power associated with the sensed data unit equals or exceeds the second threshold.

47. The tangible computer-readable medium of claim 43, wherein executing the instructions on the apparatus further cause the apparatus to drop the sensed data unit subsequent to determining the transmit power associated therewith if the transmit power associated with the sensed data unit exceeds the first threshold and the received power associated with the sensed data unit does not equal or exceed the second threshold.

48. The tangible computer-readable medium of claim 43, wherein the information in the sensed data unit that indicates the transmit power associated therewith comprises one or more bits in a PHY or MAC preamble associated with the sensed data unit.

49. The tangible computer-readable medium of claim 43, wherein executing the instructions on the apparatus further cause the apparatus to send the one or more transmissions on the medium associated with the CSMA network in a time period when the medium associated with the CSMA network is available.

50. The tangible computer-readable medium of claim 49, wherein the sensed data unit further comprises a signal field or MAC header that indicates a duration associated with the sensed data unit and the time period when the medium is available comprises at least the duration indicated in the signal field or MAC header.

51. The tangible computer-readable medium of claim 49, wherein the sensed data unit further comprises a signal field having a first duration and a media access control header having a second duration, the signal field indicates a third duration associated with the sensed data unit, and the time period when the medium is available comprises at least a portion of the third duration after one or more of the first duration or the second duration.

52. The tangible computer-readable medium of claim 49, wherein executing the instructions on the apparatus further cause the apparatus to determine that one or more of a signal field associated with the sensed data unit, a media access control header associated with the sensed data unit, or a duration associated with the sensed data unit indicate that the sensed data unit comprises a request to send packet.

53. The tangible computer-readable medium of claim 52, wherein the time period when the medium is available begins after the duration associated with the sensed data unit, a Short Interframe Space duration, and at least a portion of a duration associated with a clear to send message.

54. The tangible computer-readable medium of claim 52, wherein executing the instructions on the apparatus further cause the apparatus to:

sense a clear to send (CTS) message on the medium associated with the CSMA network;

store a network allocation vector (NAV) included in the sensed data unit, a received power associated with the sensed CTS message, and a NAV included in the sensed CTS message; and initiate the one or more transmissions on the medium associated with the CSMA network in the time period when the medium is available if the received power associated with the sensed data unit does not equal or exceed the second threshold and the received power associated with the sensed CTS message does not equal or exceed the second threshold.

55. The tangible computer-readable medium of claim 54, wherein time period when the medium is available comprises at least a duration indicated in the NAV included in one or more of the sensed data unit or the sensed CTS message.

56. The tangible computer-readable medium of claim 54, wherein executing the instructions on the apparatus further cause the apparatus to:

defer the one or more transmissions on the medium associated with the CSMA network for at least a first duration indicated in the NAV included in the sensed data unit if the received power associated with the sensed data unit equals or exceeds the second threshold; and defer the one or more transmissions on the medium associated with the CSMA network for at least a second duration indicated in the NAV included in the sensed CTS message if the received power associated with the sensed CTS message equals or exceeds the second threshold.

* * * * *